United States Patent [19]

Mick et al.

[11] 4,337,481

[45] Jun. 29, 1982

[54] MOTION AND INTRUSION DETECTING SYSTEM

[76] Inventors: Peter Mick; Donald Beck, both of 18 Wood Glen Way, R.D. 1, Boonton, N.J. 07005

[21] Appl. No.: 158,215

[22] Filed: Jun. 10, 1980

[51] Int. Cl.[3] ............................................ H04N 7/18

[52] U.S. Cl. .................................. 358/105; 358/108; 358/136

[58] Field of Search ...................... 358/105, 108, 136

[56] References Cited

U.S. PATENT DOCUMENTS 3,590,151 6/1971 Keith ................................ 358/105

3,686,434 8/1972 Lemelson .......................... 358/105

3,740,466 6/1973 Marshall et al. .................... 358/105

4,081,830 3/1978 Mick et al. ............................ 358/105

*Primary Examiner*—Joseph A. Orsino, Jr.

*Attorney, Agent, or Firm*—Frishauf, Holtz, Goodman and Woodward

[57] ABSTRACT

A motion and intrusion detecting system wherein scanning at two different rates is carried out in order to more reliably detect fast and slow motion in a scene being viewed. Also, increased noise immunity is provided by providing a special scan which generates signals inhibiting generation of alarm indications corresponding to points at which a possible noise situation exists.

55 Claims, 18 Drawing Figures

UPPER HALF

LOWER HALF

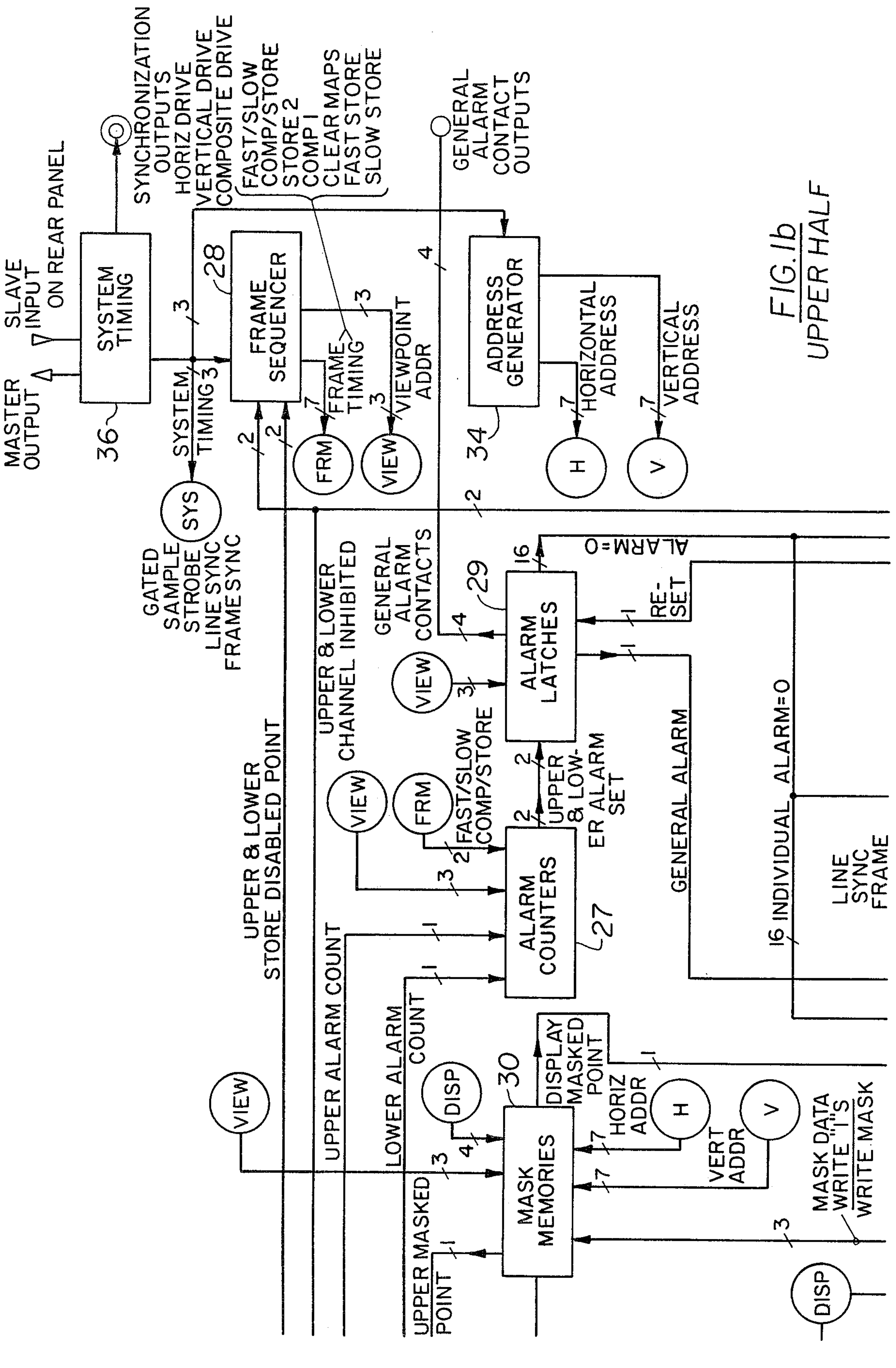
FIG. Ib
UPPER HALF

LOWER HALF
MDU-5 SYSTEM
BLOCK DIAGRAM

DUAL FRAME MEMORY 17,18

ALARM DETECTOR LOGIC 23,24

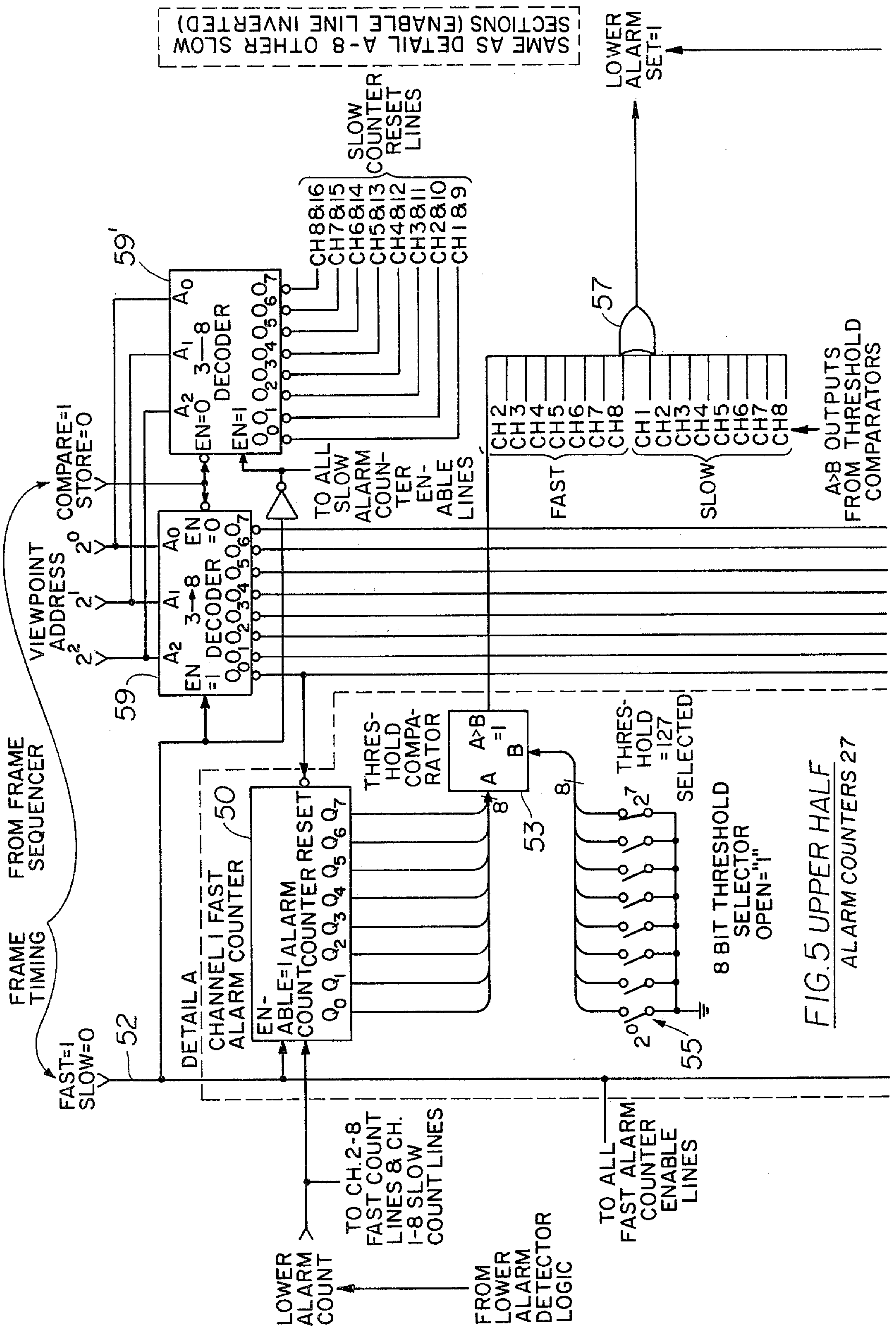
FIG. 5 UPPER HALF
ALARM COUNTERS 27

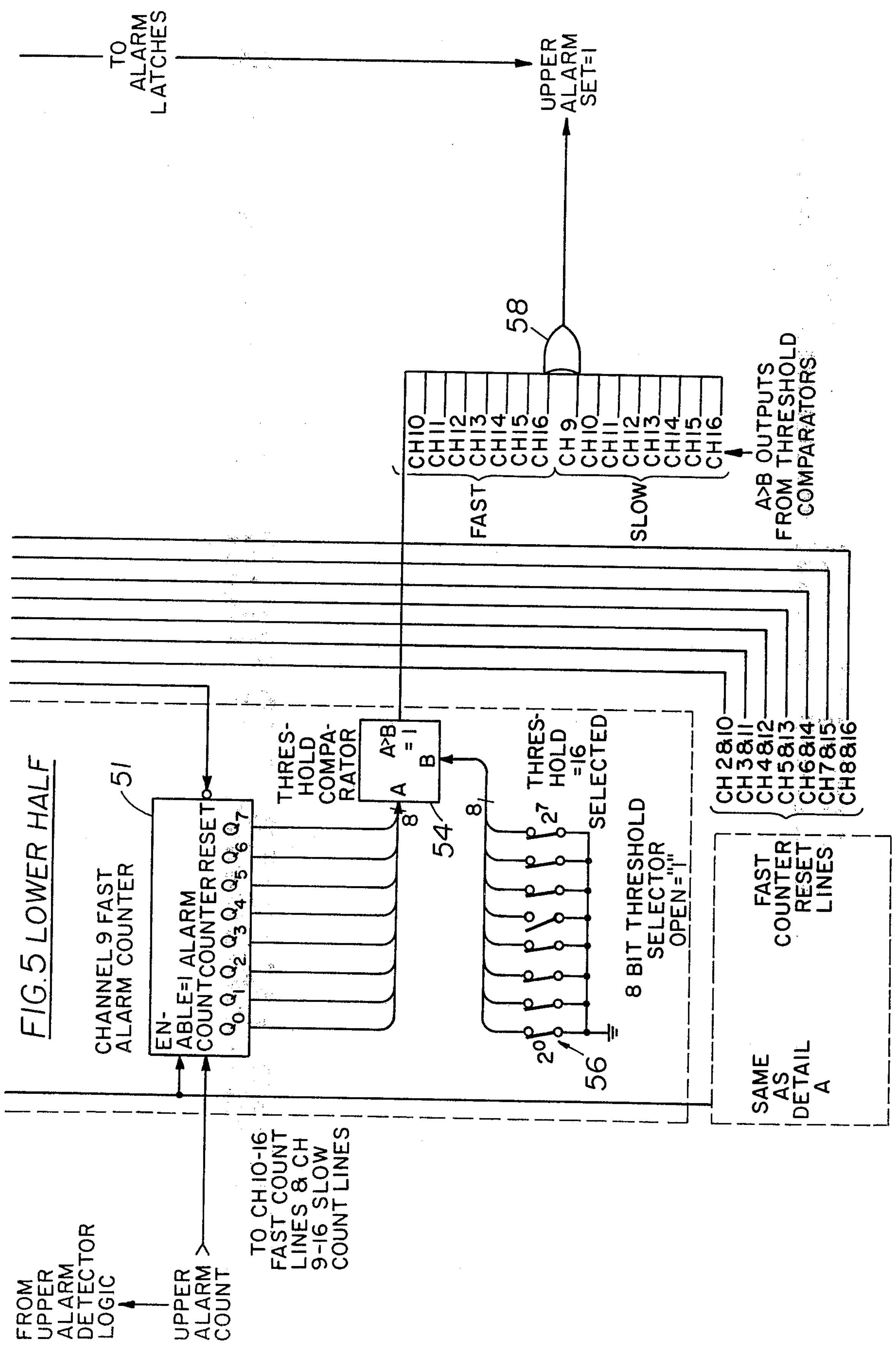
FIG. 5 LOWER HALF

ALARM LATCHES 29

| SELECTION | RESOLUTION | SIZE | POSITION | R1 | R0 | P2 | P1 | P0 |
|---|---|---|---|---|---|---|---|---|
| 1 | x4 | 1/4 | 0 | 0 | 0 | 0 | 0 | 0 |
| 2 | x4 | 1/4 | 16 | 0 | 0 | 0 | 0 | 1 |
| 3 | x4 | 1/4 | 32 | 0 | 0 | 0 | 1 | 0 |
| 4 | x4 | 1/4 | 48 | 0 | 0 | 0 | 1 | 1 |
| 5 | x2 | 1/2 | 0 | 0 | 1 | 0 | 0 | 0 |
| 6 | x2 | 1/2 | 64 | 0 | 1 | 1 | 0 | 0 |
| 7 | x2 | 1/2 | 128 | 0 | 1 | 1 | 0 | 1 |
| 8 | NORMAL | FULL | 0 | 1 | 0 | 0 | 0 | 0 |

VERTICAL SAMPLING RATE SELECTORS 32,33

LOWER MAP MEMORIES 25 (UPPER IS SIMILAR)

MASKING CONTROLS 35

MASK MEMORIES 30

FRAME SEQUENCER 28

TIMING DIAGRAM

ADDRESS GENERATOR 34

DISPLAY MODULATION 31

DISPLAY ADDRESS SELECTOR 37

MOTION AND INTRUSION DETECTING SYSTEM

CROSS-REFERENCE TO RELATED PATENTS

U.S. Pat. No. 3,988,533, dated Oct. 26, 1976 and U.S. Pat. No. 4,081,830, dated Mar. 28, 1978, assigned to the same assignee as the present application, the entire contents of which are incorporated herein by reference.

BACKGROUND OF THE INVENTION

The present invention relates to a motion and intrusion detection system, and more particularly to a method and apparatus for utilizing a video camera and associated circuitry to detect motion in a given field of view and to produce an alarm condition when such motion is detected and/or to focus attention on the motion.

While the present invention is described herewith with reference to a surveillance system, it should be clear that the invention is applicable to any other type of video or television system wherein it is desired to detect motion, changes in grey scale, changes of position or intrusion into a given field of view, and to produce an alarm condition and/or focus on the motion and follow the motion. Moreover, while the invention is described with respect to a conventional type of video camera, the techniques and inventive concepts are equally applicable with low-light level cameras as well as the conventional camera. Additionally, heat sensing or infrared devices can be used in place of the conventional video camera. No limitation is placed on the type of video sensor used in the system.

The main object of the present invention is to provide an improved system over that illustrated in U.S. Pat. Nos. 3,988,533 and 4,081,830 so that the system has improved sensitivity and increased noise immunity.

SUMMARY OF THE INVENTION

In accordance with a first aspect of the invention, a method and apparatus for motion detecting comprises scanning a given field for generating scan signals corresponding to the content of the given field, the given field being scanned at a first predetermined scanning rate and subsequently scanned at a second predetermined scanning rate which is different from the first scanning rate. The scan signals are converted into coded digital signals which correspond to the characteristics of the field content at a plurality of points in the field, and the coded information is stored. The coded information corresponding to one of the fields is compared with coded information corresponding to the same field at a later time, this comparison being carried out for both scanning rates, respectively. An alarm signal and/or indication is generated when the comparison exceeds a predetermined level for a predetermined number of points.

According to a further aspect of the invention, scanning for each scanning rate is carried out a plurality of times for the storage mode of the system to inhibit generation of alarm signals when a "noisy" point is detected. This is accomplished by having two successive storing cycles whereby when information from the second storing cycle does not agree with information from the first storing cycle, a "noisy" point is assumed and alarm generation in subsequent scans is inhibited. This is carried out for scans of both scanning rates.

BRIEF DESCRIPTION OF THE DRAWINGS

FIG. 5 is a block diagram of an alarm counter used in the present invention;

DETAILED DESCRIPTION

A discussion of the general principles of operation of the basic detection system of the type to which the present invention pertains is given in said U.S. Pat. Nos. 3,988,533 and 4,081,830 and is therefore not repeated herein.

Figure 1A:
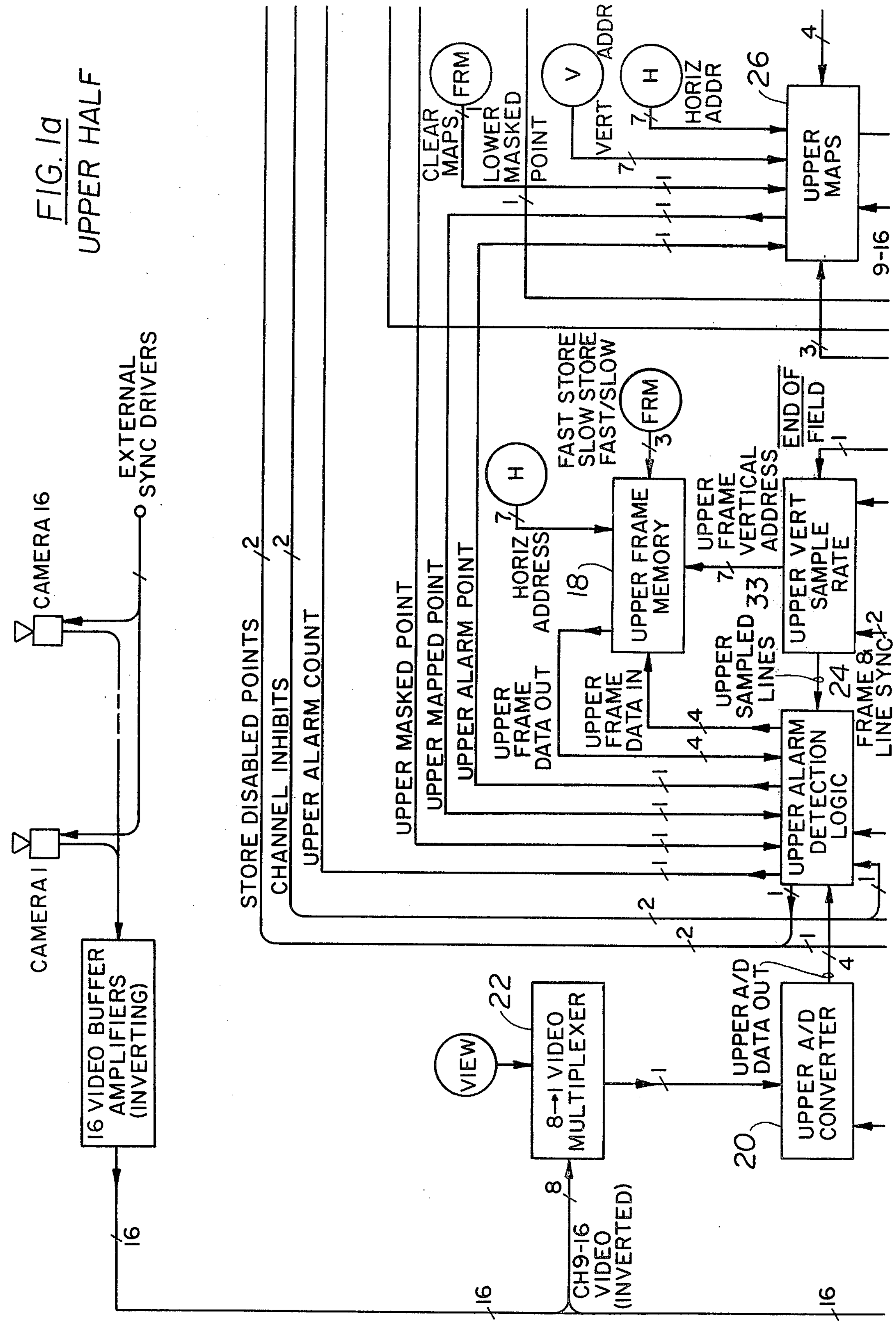
FIGS. 1*a* and 1*b*, when connected together as indicated, illustrate a basic block diagram of a system according to the present invention.
Figure 1A:
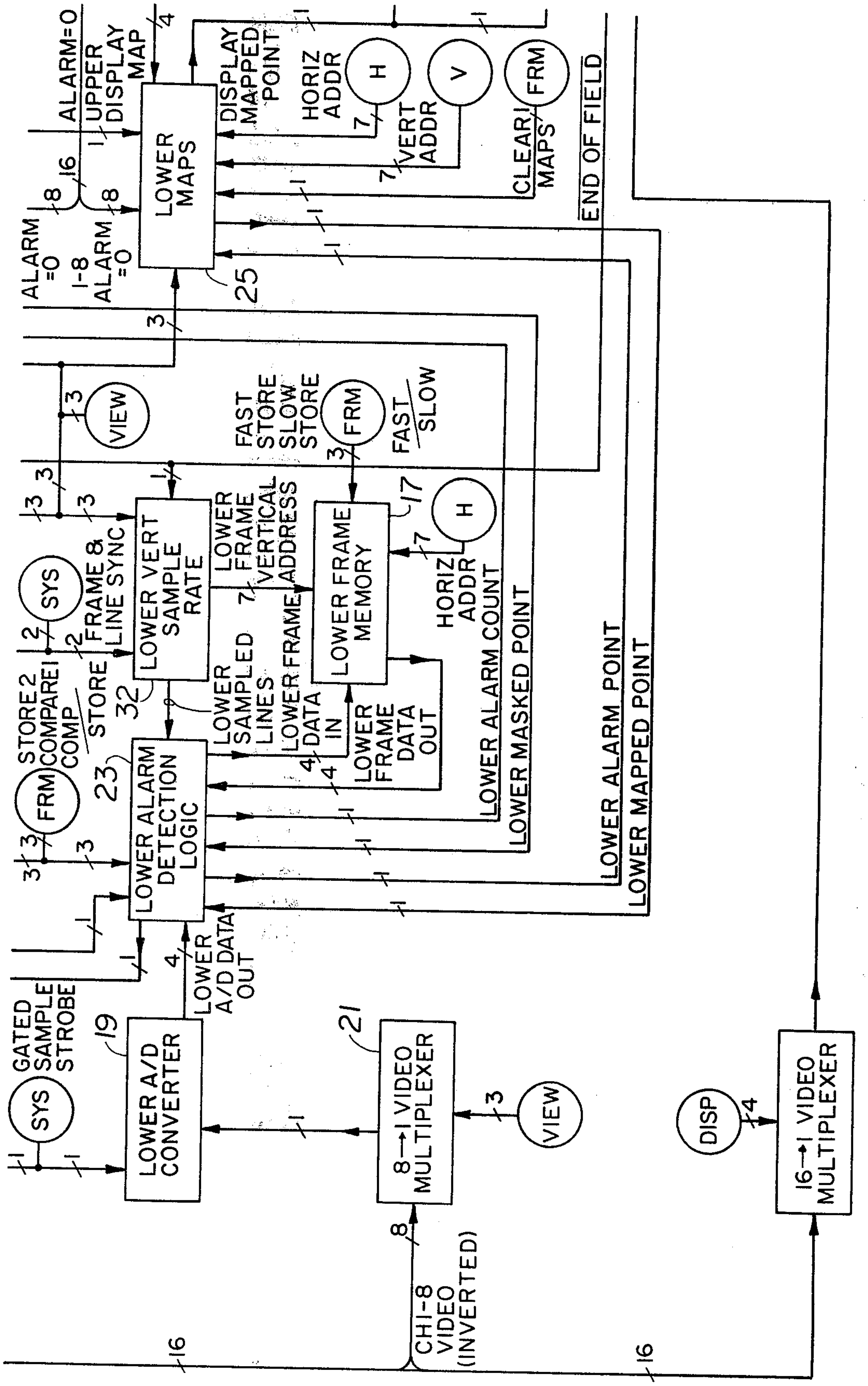
Figure 1B:
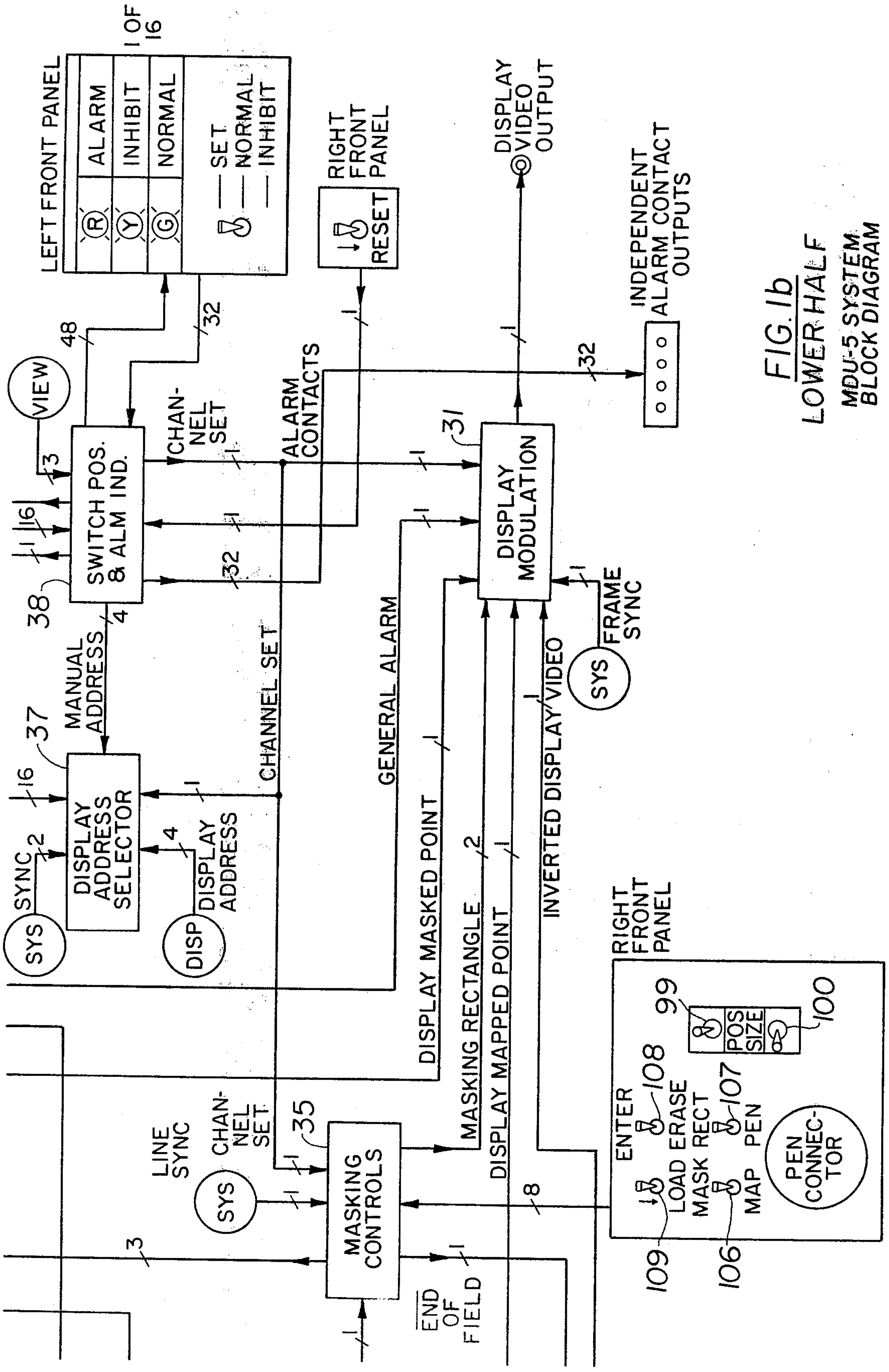

FIGS. 1*a* and 1*b*, when connected together as indicated, comprise a basic block diagram of the system according to the present invention. The system of FIGS. 1*a* and 1*b* is described in connection with using sixteen video cameras. However, as should be apparent, any other number of cameras may be used, depending upon system requirements. The lower numbered cameras 1–8 have their outputs supplied as either the input to a designated fast scan or a slow scan frame storage memory. The upper numbered cameras 9–16 have their outputs supplied as either the input to a designated fast scan or slow scan frame storage memory 18. Each of the cameras 1–16 is preferably dedicated to a specific monitored site scene. The lower numbered camera fast scan/slow scan outputs are processed in a lower analog-to-digital (A/D) converter 19 and are routed under system control to the respective lower fast scan and lower slow scan frame storage memory 17. The upper numbered camera fast scan/slow scan outputs are processed by the upper A/D converter 20 and are routed under system control (logic) to the respective upper fast scan and upper slow scan frame storage memory 18. Under system control, as generally illustrated in FIG. 1*a*, the outputs of camera group pairs, that is, camera pair 1 and 9, camera pair 2 and 10, camera pair 3 and 11

. . . camera pair 8 and 16, are simultaneously processed for fast scan and slow scan in a predetermined sequence. In all cases, a fast scan is followed by a slow scan interval, but not necessarily by an ascending camera group pair. A fast scan interval comprises five frames which are dedicated to specified operations, namely Store 1, Store 2, Compare 1, Compare 2 and Compare 3. A slow scan interval comprises generally two frames which are dedicated to specific orderly operations, namely Store 1, Store 2, Compare 1 and Compare 2. The step-by-step functional system operation for each camera group pair during a fast scan and slow scan interval operation are identical. A discussion of the system operation is given below based upon camera group pair 1 and 9 and the relationship between the actions occurring during each operation in a fast scan interval and a slow scan interval will be described in detail. Each interval in both the fast scan and slow scan operations corresponds to one frame period of video camera scan scene output.

The system illustrated in FIGS. 1*a* and 1*b* uses a time-sharing fast scan/slow scan technique, the fast scan being primarily for the detection of fast moving objects in the field of view and the slow scan being primarily for detection of slow moving objects in the field of view. The scanning times are chosen so as not to leave a dead band of little or no sensitivity for motion detection. As seen in the figures, the example under discussion has sixteen video cameras for detecting motion at sixteen separate locations. The problem of detecting motion at sixteen separate locations is solved by time sharing the system among the different channels. Since this would normally cause long intervals between the viewing of a particular camera (while other cameras are being scanned and the outputs thereof being evaluated), the sixteen cameras have been split into two sets (lower numbered cameras 1–8 and upper numbered cameras 9–16) and the outputs from two cameras are processed simultaneously in separate channels in the system. Time sharing of the pairs of cameras is done by cycling the viewpoint address and feeding the address to selectors 21,22 (which are generally multiplexers) for selecting a particular camera corresponding to the viewpoint address. The viewpoint address is sequentially cycled through the eight possible addresses with, for example, a three bit digital address. This cycling could cause long "dead" periods for the cameras not being analyzed when the cameras are to be viewed or operated on for the amount of time necessary to detect slow moving objects. In some cases, a camera may have to be viewed for up to three seconds, making the time interval between views for a given camera around 21 seconds. This problem is solved by further time sharing the system. Since there are about 90 video frames in a three second interval that a particular camera is viewed, checking motion on every one of the video frames would be wasteful, especially as far as detection of slow moving objects is concerned. In accordance with the present invention, it is possible to intersperse periods of detection on other channels within the normal slow detection period of a given channel. It has been found that about 5/7 of the time may be spent looking at other channels. This will not detract from the sensitivity of the system since the detection of the fast moving objects is done primarily by this fast scan, whereas slow moving objects are detected by the slow three second scan. In the fast scanning sequence, the viewpoint address (denoting a camera) is sequenced at a fast rate so that only a 1.3 second interval is provided between viewing a particular camera. The times for the slow and fast scan may, of course, be varied, the times mentioned hereinabove being merely exemplary.

Figure 2:
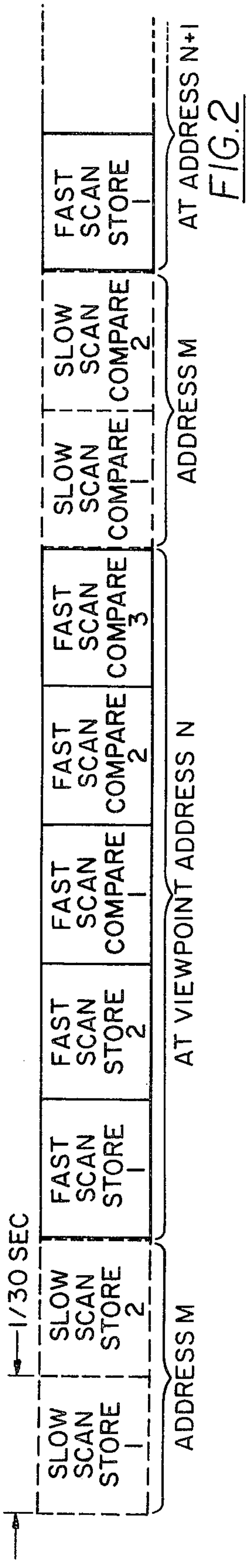
FIG. 2 illustrates a 7-frame operational cycle used in the present inventive concept.

The fast and slow viewpoint addresses are not necessarily correlated and the viewpoints are therefore evenly distributed in time, providing the necessary probability of detection on any channel. As mentioned before, the fast scan uses 5/7 of the system processing time. If a particular 7 frame long cycle is considered, as shown in FIG. 2, there would first be 2 frames where the viewed channel is determined by the slow viewpoint address, then 5 frames for viewing the fast viewpoint address. Within the 5 fast frames there are two frames of storage, then 3 frames for comparisons. The functions of the store frames and compare frames are the same whether they occur in fast or slow scanning areas. This operating sequence carries out the aforementioned noise reduction or noise immunity function.

The sequence of operations during the store and compare intervals will now be described in more detail with reference to FIGS. 1*a*, 1*b* and 2.

During the fast scan Store 1 interval, the lower numbered camera video and the upper numbered camera video are processed by the lower A/D and the upper A/D converters 19 and 20, respectively, into respective digitized video signals and routed under system control to the lower and the upper fast scan frame storage memory, 17 and 18 respectively. Any noise in the respective video signals is also digitized along with the desired video and stored in the applicable memory.

For the Store 1 interval, the video is selected by an 8 input single output analog selector (multiplexer) 21 or 22, depending upon the particular video camera, and converted to a 15 level code by the respective A/D converter 19 or 20 which outputs 15 levels of grey scale on 4 digital bits. The 16 level (digital 1111) is reserved for a flag signal. The 15 level grey scale data is stored in a respective 16K×4-bit memory 17,18 which can store 16,384 points of video. Half of these are sampled from the even field and the rest from the odd field. The sampling is uniform in density with variable resolution in the vertical plane. The 1111 flag signal is used to desensitize points which have either been detected as containing noise or counted by the alarm counter.

During the fast scan Store 2 interval, the next (or second) video frame of the lower numbered camera video and of the upper numbered camera video are processed by the lower A/D and the upper A/D converters, 19 and 20, respectively, into a digitized video signal. During this cycle, a comparison is made in alarm detection logic circuits 23,24 between the incoming digitized video from the second frame and the digital equivalent of the frame previously stored in memory during the Store 1 interval cycle. This is similar to the arrangement in FIG. 1*d* of prior U.S. Pat. No. 4,081,830. If a difference equal to or greater than, for example two grey levels exists (or one grey level, if desired), the points are tagged in memory as possible noise inputs and further comparisons are disabled during the fast scan cycle. This may be done by storing a flag (binary 1111) in the memory location corresponding to the tagged points. All other video information is left as stored in the memory during the Store 1 interval in order that subsequent compares be at least 1 frame removed from the stored video. Thus, the Store 2 interval actually removes points which differ due to noise in the video on either frame and possibly a few points due to motion. If compares were allowed on the noisy reference video points, it is unlikely that the same noise would occur again at the same point and the perfectly normal incoming video would show a difference when compared to the stored noise even if no motion has occurred. Thus, the flagged or tagged points are not processed during the subsequent compare intervals.

During the fast scan Compare 1 interval, like the Store 2 interval, incoming video is compared to the reference video stored in memory 17 or 18. If a difference exceeding a predetermined value is detected (i.e., a given number of grey levels) instead of inserting a flag into the frame, the points are considered alarm points and are recorded in a separate 16K×1 memory called the upper alarm map memory 26 or lower alarm map memory 25 by loading a "1" at that point in memory corresponding to the alarm point. This action is overruled if the alarm point has been masked or the channel has been inhibited. These actions will be discussed later. It is possible that noisy incoming video during a compare cycle would cause invalid alarms. To avoid this, only alarms that occur twice at the same location are counted as valid and are passed to the alarm counters 27. In other words, in the event that a point is already mapped (present in an alarm map memory) and it occurs again, it will be counted. All alarms are mapped on Compare 1 but counting is reserved for the next compare cycles which are described below.

During the fast scan Compare 2 and Compare 3 cycles, a similar comparison is made as in fast scan Compare 1 and for each point that exceeds system parameters a check is made into an alarm map 25 or 26 to determine if that point has already been marked in the alarm map. If an alarm map contains an alarm indication for that point, the alarm counter 27 is incremented. If not, the alarm point is stored in the alarm map and the alarm counter 27 is not incremented. Thus, points are not counted by the alarm counter 27 if they have already been mapped in an alarm map 25,26 during a previous compare cycle.

If a point should alarm and be counted, it is flagged with 1111 in the reference memory 17,18 to avoid double counting of alarm points. A guaranteed single count provides the necessary correlation between alarm count and intruder penetration into the sensitized area.

The slow scan has the same cycles as described above for the fast scan, but these cycles occur in pairs in between the fast scan cycles. See FIG. 2. After a new viewpoint address for the slow scan has been selected, the first pair is Store 1, Store 2, the second pair is Compare 1, Compare 2, and all remaining cycles are Compare 2, Compare 3. See FIG. 3.

The frame sequencer 28 is incremented (i.e., viewpoint address is incremented) after the fifth frame of the fast scan (see FIG. 2) to address the next higher camera pair (for fast scan) until the eighth camera pair (8/16) has been fast scanned. The counter then recycles to begin again with the first camera pair (1/9).

The frame sequencer 28 is similarly incremented for slow scan; however, the rate may be adjustable by an internal switch. This provides the ability to adjust the refresh interval of the slow can portion of the reference memory 17,18 for a particular application. Long refresh intervals have the the advantage of enabling detection of extremely slow moving objects in the field of view with very high detection probabilities.

Figure 3:
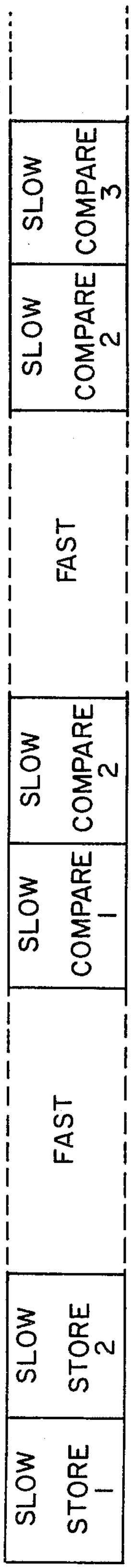
FIG. 3 illustrates operational sequences in carrying out the present invention.

The slow can sequence is shown in FIG. 3. The number of slow Compare 2 and slow Compare 3 cycles is variable per the refresh interval selected. Note that the slow scan frames shown are not contiguous but are interspersed with fast scan cycles dividing the slow scan into frame pairs and that slow scan Compare 1 occurs only once per slow scanning sequence.

In summary, fast and slow scan cycles are multiplexed in time with one complete fast cycle comprised of five frames interleaved between two slow scan frames which could either be slow Store 1, 2, slow Compare 1,2 or slow Compare 2,3. Camera pairs processed in adjacent fast and slow scans need not bear a fixed relationship to each other due to the independent address counters provided for each scan.

A more detailed discussion of the various elements of FIGS. 1A and 1B is given below in order to provide a better understanding of the present inventive concept.

The selectors or multiplexers 21,22 are video switching units which pass one of eight inputs. The selectors 21,22 also preferably apply adjustments for each channel to set their bias (DC offset) and gain to provide similar video levels to the respective A/D converters 19,20 regardless of the channel selected. A further discussion of selectors 21,22 is deemed unnecessary.

A/D converters 19,20 convert the selected video signal into a 15 grey level digital signal, and are similar to the A/D converter 21 shown in FIG. 1C of U.S. Pat. Nos. 3,988,533 and 4,081,830. The maximum binary output is 1110. Upper and lower ranging or reference voltages may be fed to A/D converters 20 and 19, respectively, by automatic ranging circuitry which periodically adjusts the ranging to give a fully resolved digital picture which takes advantage of the full spectrum of grey levels available. A manual ranging system which can be made automatic is disclosed in U.S. Pat. Nos. 3,988,533 and 4,081,830.

The comparison logic circuits 23,24 decode the respective incoming digital video signal and a reference signal from respective memories 17,18 and compares them. The comparison circuit outputs a "1" if the input differs from the reference by more than 1 grey level. The criteria of a difference greater than 1 is necessary since the boundaries between grey levels in the video are somewhat noisy and therefore the grey level at any point on the boundary is ambiguous.

Frame memories 17,18 for both fast and slow scans contain the reference video for the fast and slow compare scans. The fast memory section updates the reference video at the fast scan rate while the slow memory section updates at the slow scan rate. Both of these memory sections (contained in a single memory 17,18) time-share the same A/D converter. Each frame memory 17,18 can be considered to be arranged in quadrants. The first quadrant covers the top of the even field, the second the bottom, and the third and fourth quadrants respectively cover the top and bottom of the odd field.

The various blocks of the invention as illustrated in FIGS. 1*a* and 1*b* are described briefly below with reference to the drawings.

Figure 4:
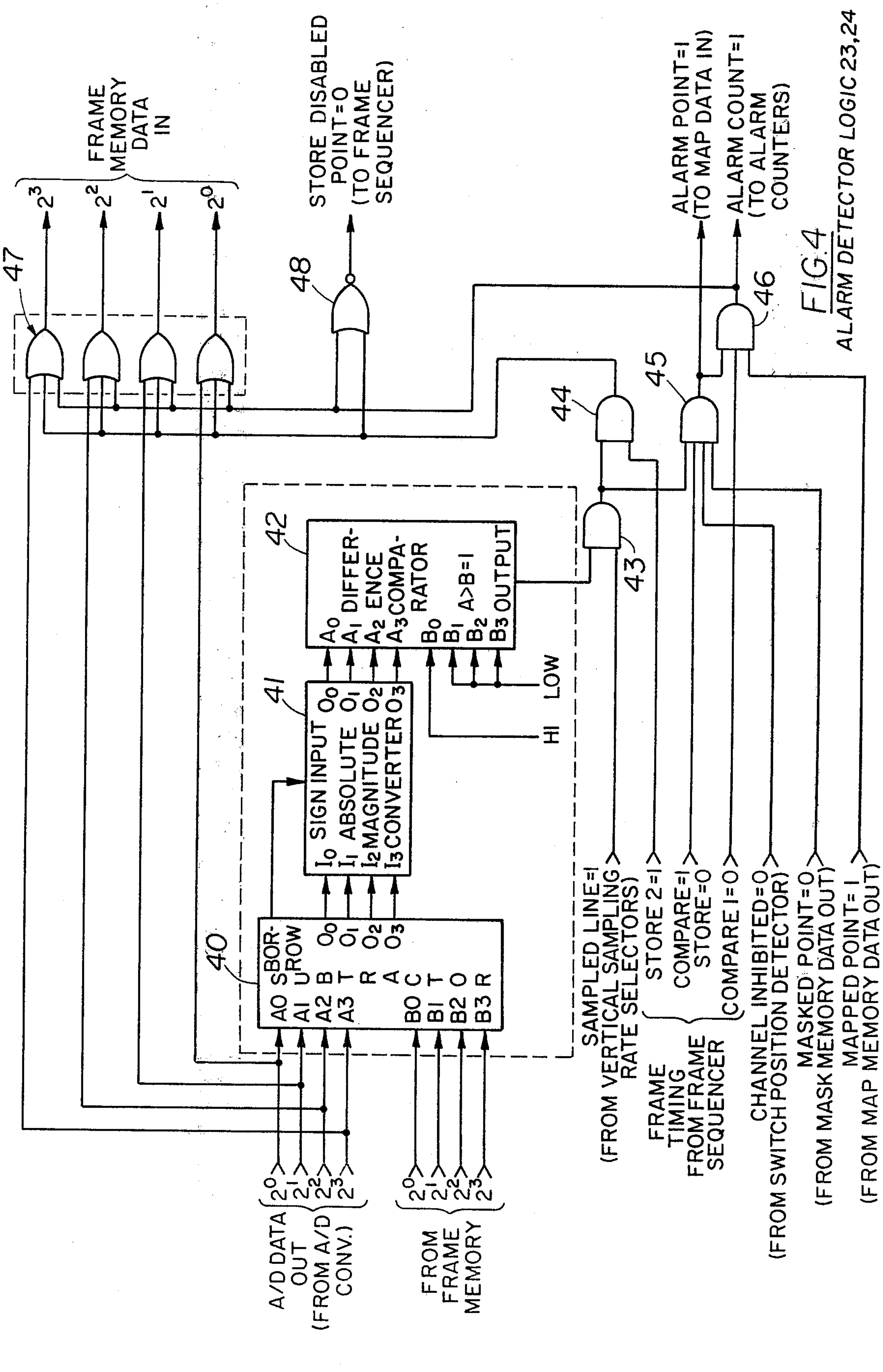
FIG. 4 is a block diagram representation of a typical alarm detector logic.

Referring to FIG. 4, an alarm detector logic 23,24 is shown in general block diagram form. The alarm detector logic circuits 23 and 24 are substantially identical, only one being shown in FIG. 4. The alarm detector logic comprises a subtractor 40 for subtracting the data output from the A/D converter from the data output from a frame memory (upper or lower, depending upon which alarm detector is being referred to). The output from subtractor is coupled to an absolute magnitude converter, the absolute magnitude output thereof being coupled to a difference comparator 42 which compares the absolute magnitude of the difference with a reference signal. If the difference corresponds to a change in grey scale of more than one grey scale level, an output signal is supplied to gate 43. Gate 43 also receives a timing signal so that it emits an output only if the input signal indicates that a corresponding sampled line is being examined. The output of gate 43 is then supplied directly to gates 44 and 45, and indirectly to gate 46, to generate appropriate output signals, depending upon frame timing and depending upon the particular sequence being carried out (that is, store, compare, etc.). If an alarm condition is detected and if the system is operating in the store 2 sequence, the output of gate 44 is supplied to gates 47 for gating the information (i.e. forces a 1111 code) to the corresponding point in the associated frame memory 17,18. During the compare sequences of a cycle, the alarm signal is fed to the alarm map from gate 45 and to the alarm counter from gate 46. The system also includes channel inhibit signals, masked point signals and mapped point signals to inhibit or permit various data to be gated out of the alarm detector logic, as required by system operation. Gate 48 couples the outputs of gates 44 and 46 to the frame sequencer. If the output of gate 48 is zero, this indicates a disabled point to be stored in memory.

Figure 12:
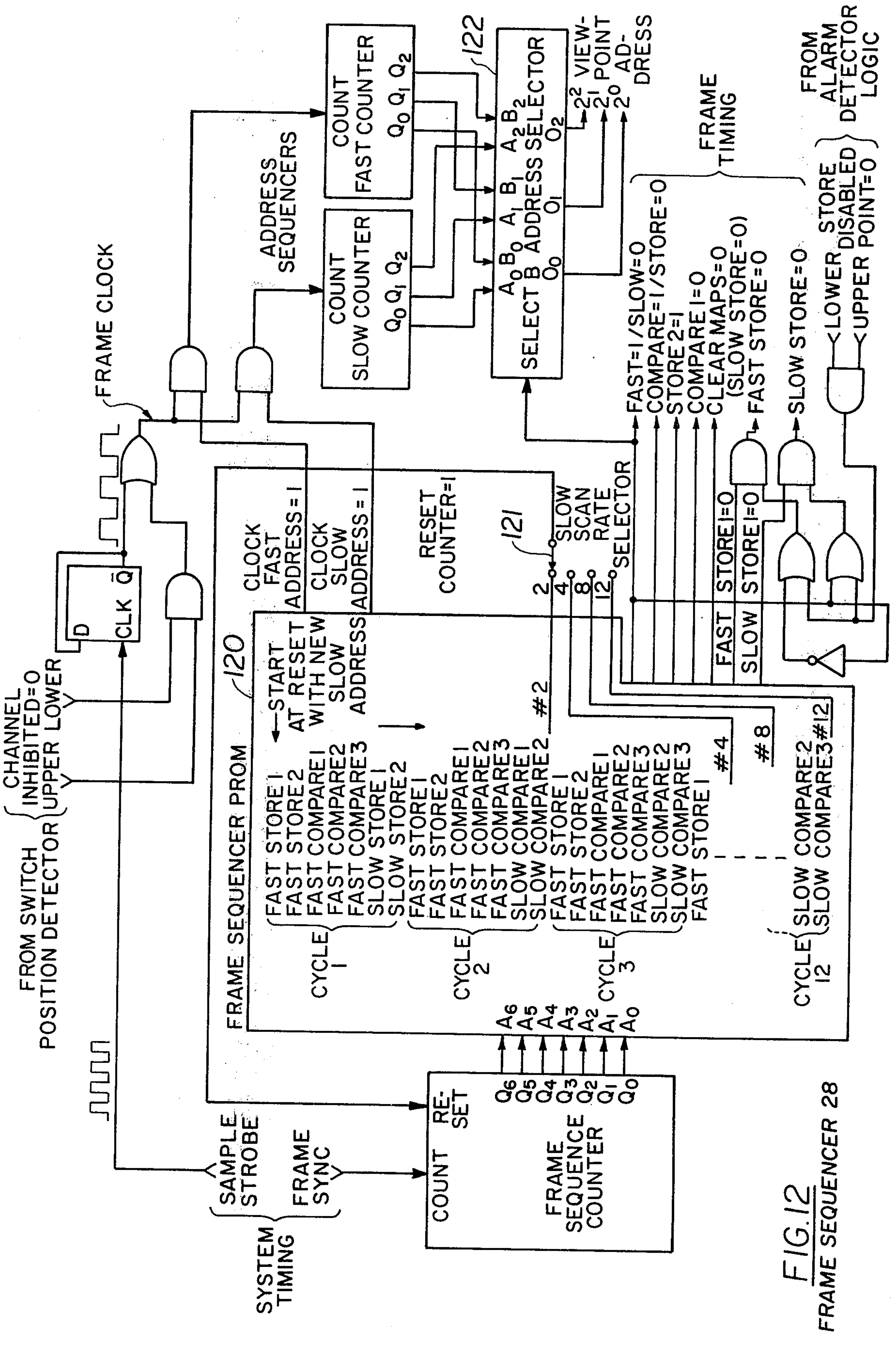
FIG. 12 is a block diagram of a frame sequencer of the present invention.
Figure 13:
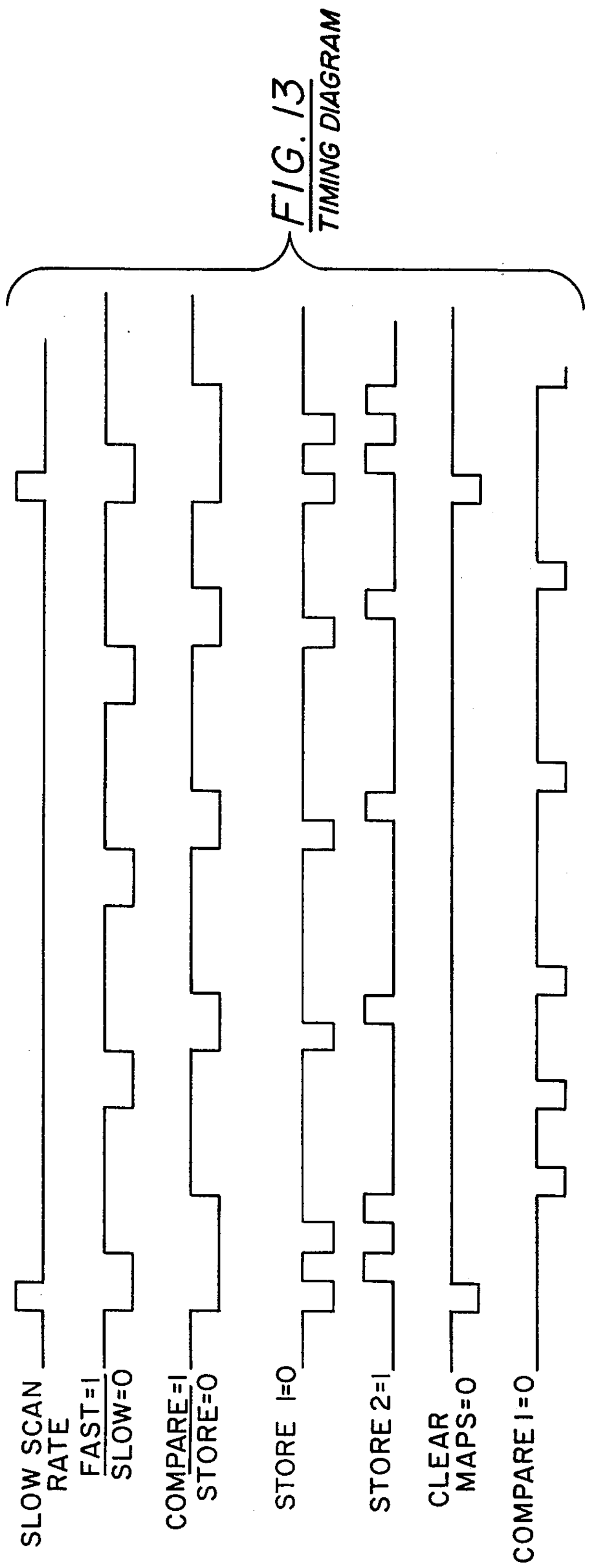
FIG. 13 is a timing diagram for the frame sequencer of FIG. 12.

The frame sequencer 28, shown generally in FIG. 1*b* and in more detail in FIG. 12, operates under PROM program control. The frame sequencer comprises a PROM 120 for controlling cycling as indicated in FIG. 12, and a switch 121 for providing various switch selectable slow scan rates. The frame sequencer generates the frame cycle sequence and all the necessary signal for data control and noise rejection as well as the viewpoint address at the output of an address selector 122 which is coupled to selectors 21,22. If a certain viewpoint addressed channel is inhibited from alarming (i.e. under control of the front panel switches) on both upper and lower camera units, an inhibited channel bypass occurs which moves the viewpoint address past the inhibited address in order to totally desensitize the inhibited channels. A typical timing diagram for the frame sequencer 28 is shown in FIG. 13. The viewpoint address generated by the frame sequencer is coupled to the various other portions of the system, as generally indicated in FIGS. 1*a* and 1*b*, as well as throughout the following descriptions of the various sub-structures of the invention.

FIG. 5 illustrates details of a typical alarm counter 27. The alarm counter 27 receives lower alarm count signals and upper alarm count signals from lower alarm detection logic 23 and upper alarm detection logic 24, respectively. These signals are respectively fed into alarm counter devices 50,51 which count the alarm occurrences for channels 1 and 9, respectively. As indicated in FIG. 5, similar alarm counter devices are provided for the other channels. A switching signal is provided on line 52 to switch operation from fast to slow modes. Each alarm counter device has an associated threshold comparator 53,54, respectively, the comparators having threshold signals being coupled thereto via threshold switches 55,56, respectively. The threshold switches set the threshold comparator so that an alarm signal is generated only when the number of alarm counts exceeds the level B set by the threshold selector switches 55,56. The outputs of the various threshold comparators are coupled to respective gates 57,58 for the lower and upper channels, respectively, which provide alarm outputs which are coupled to the alarm latches, the details of which are described in connection with FIG. 6 hereinbelow. The viewpoint address (discussed in connection with the frame sequencer of FIG. 12) is coupled to decoders 59,59' which also receives an input signal designating either the compare or store segment of a cycle, the decoders supplying outputs to the various alarm counter reset terminals, depending upon the viewpoint address and also depending upon whether the fast or slow scan is being carried out, this information being supplied from line 52.

Figure 6:
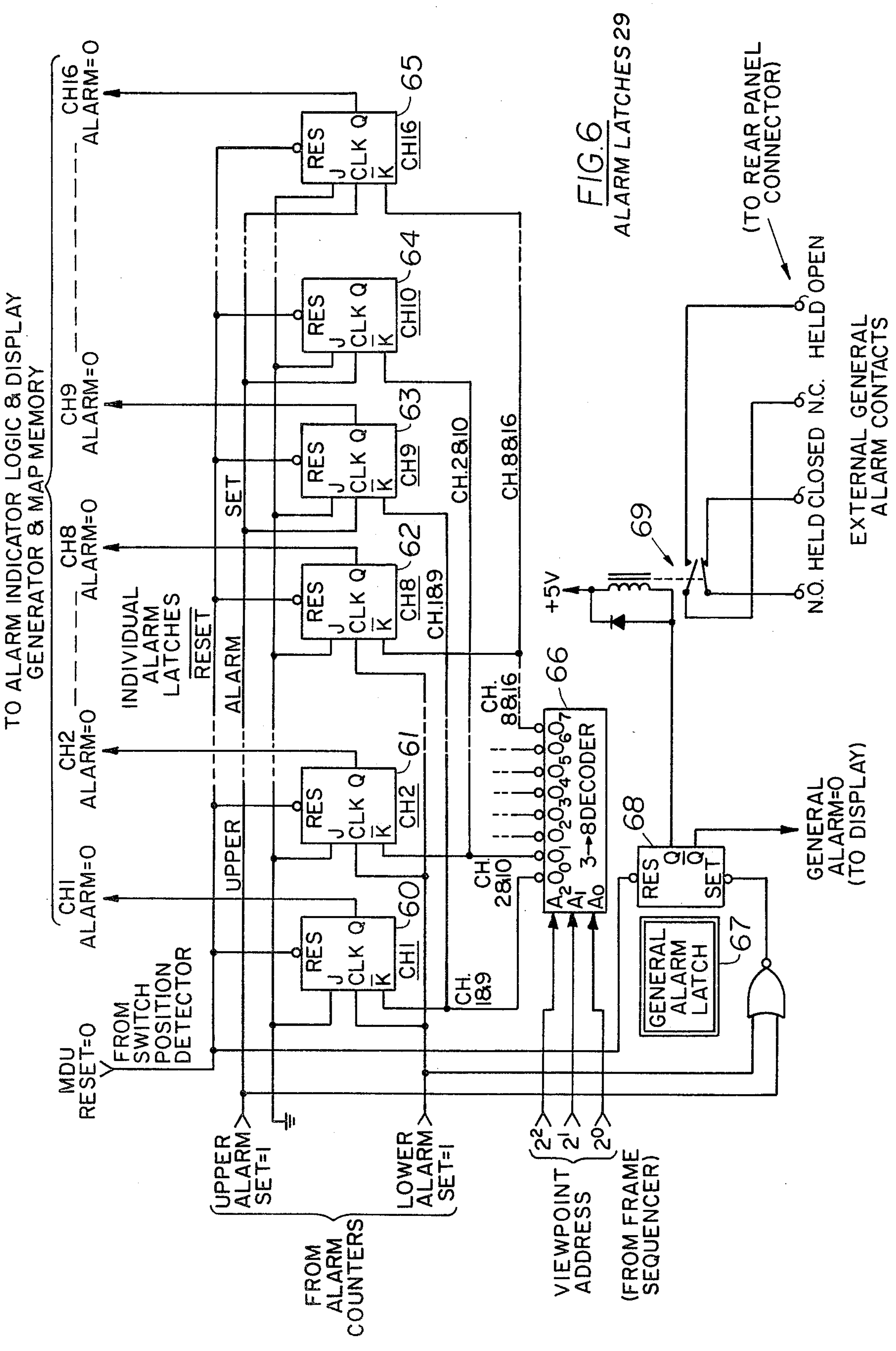
FIG. 6 is a block diagram of an alarm latch used in the invention.

The alarm latches 29 of FIG. 6 receive alarm set inputs from the alarm counters 27. Only upper and lower alarm set signals are coupled to the alarm latches, the viewpoint address from the frame sequencer being decoded to effectively gate the alarm set signal through the proper flip-flop 60,61 . . . 65. The viewpoint address is decoded in a decoder 66. Depending upon the inputs to the flip-flops 60–65, an alarm signal is generated designating an alarm at a particular channel. The channel alarm signals are then coupled to the alarm indicator logic, display address generaor and to the map memory, as indicated in FIG. 6. Only flip-flops 60–65 are illustrated, the arrows between 61 and 62 and between flip-flops 64,65 indicating that additional respective flip-flops are provided for the remainder of the channels.

A general alarm latch 67 is provided for setting a flip-flop 68 to produce a general alarm signal, as desired. Also provided is a relay 69 which provides general external alarm contacts, for example accessible on the rear panel of the apparatus.

Figure 7:
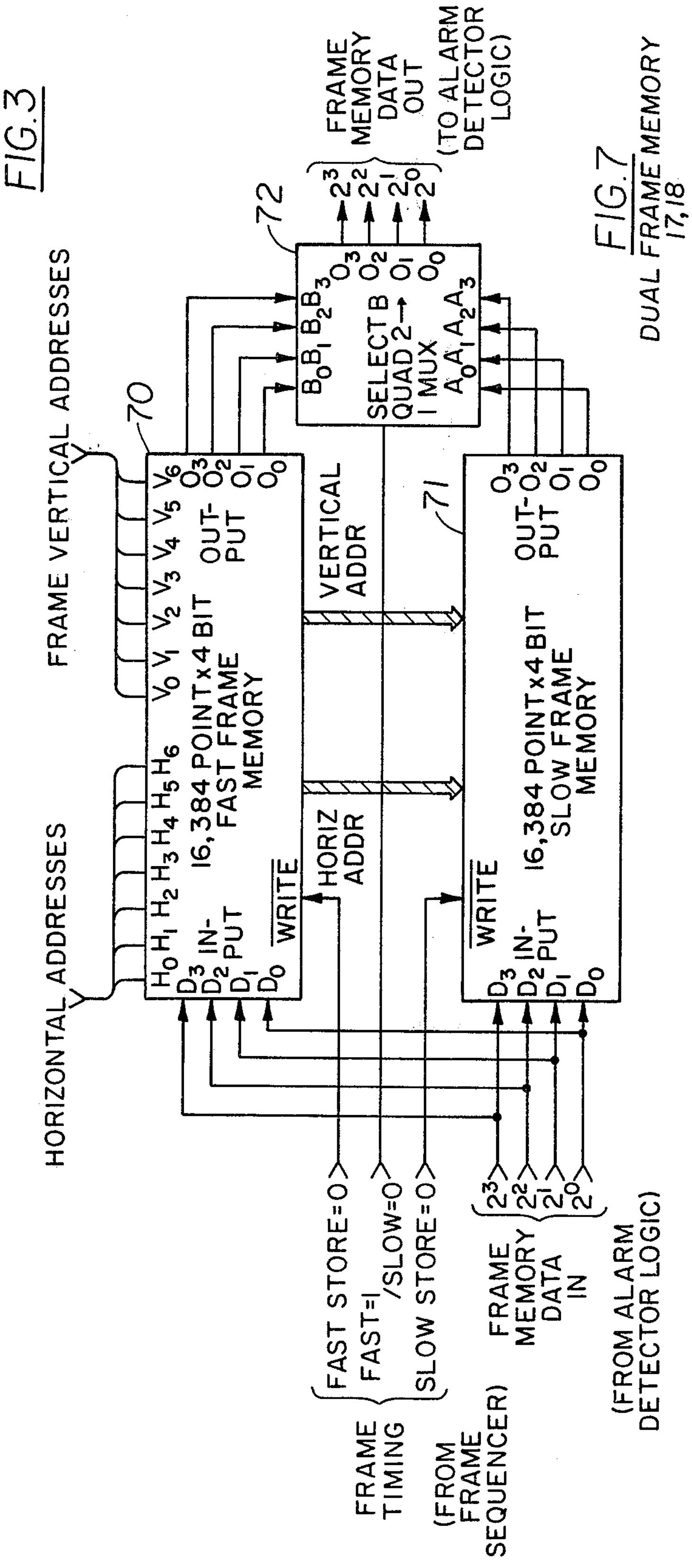
FIG. 7 is a block diagram of the frame memory.

The frame memories 17,18 are shown in FIG. 7 in basic block form. FIG. 7 illustrates only one of the memories 17,18, the other being identical. Frame timing information is received from frame sequencer and coupled to the fast frame memory 70, slow frame memory 71 and to a multiplex device 72 which provides frame memory data which is coupled to the associated alarm detection logic 23,24. Frame memory data from the associated alarm detection logic is coupled directly to the inputs of fast frame memory 70 and slow frame memory 71. Horizontal and vertical addresses are provided to the frame memories 70,71 so that the input data is stored in proper locations within the memories.

Figures 8, 8A:
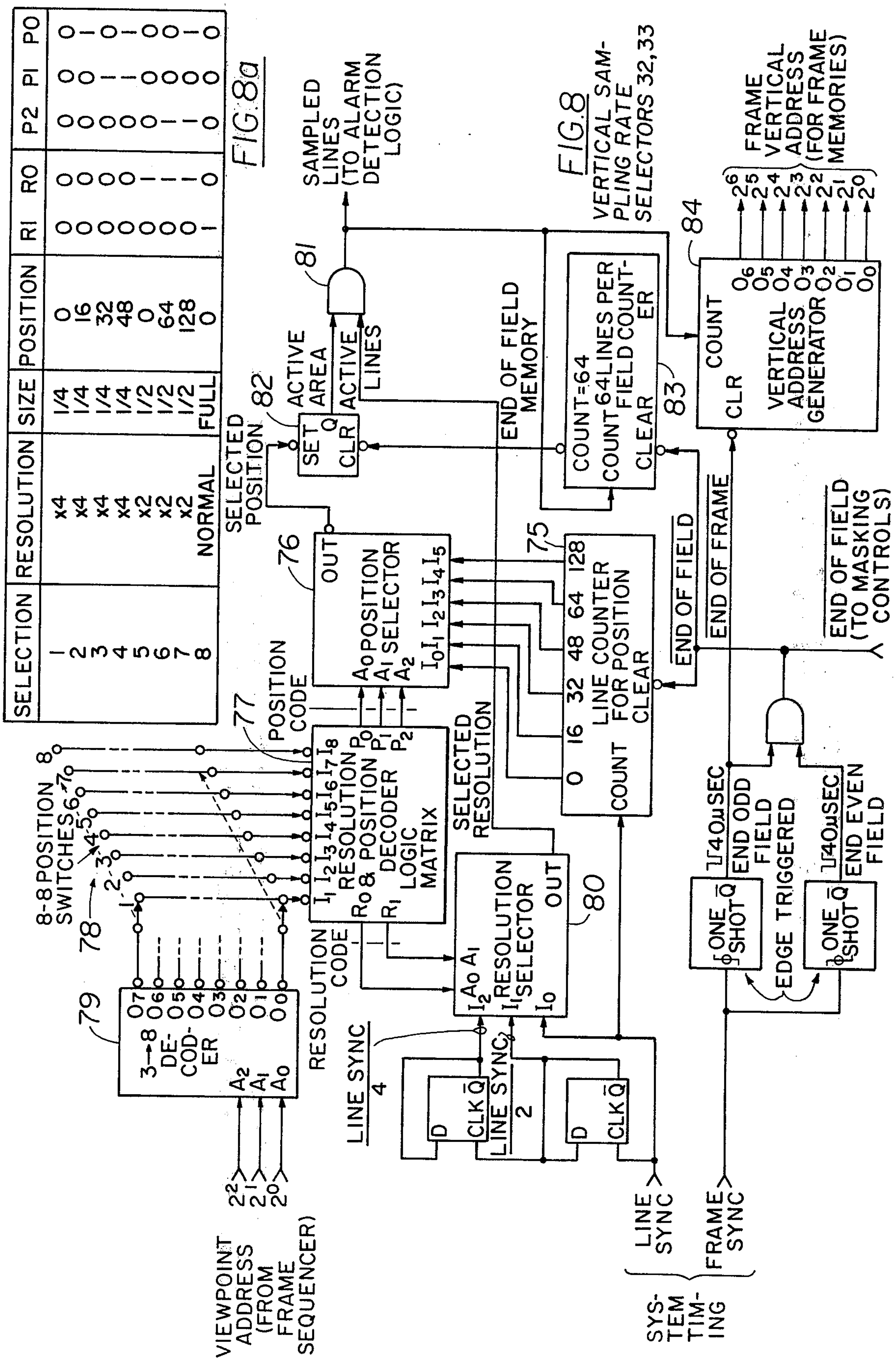
FIG. 8 is a block diagram of the vertical sampling rate selectors of the invention.
FIG. 8*a* is the logic diagram for the circuit of FIG. 8.

FIG. 8 illustrates a vertical sampling rate selector. Only one selector is shown. However, the selectors 32,33 are substantially identical. System timing signals are coupled to a line counter 75, the output of which is coupled to a position selector 76. Essentially, position selector 76 is a decoder which receives position code information from a resolution and position decoder 77 which operates in accordance with the table of FIG. 8*a* in response to switches 78 which receive inputs from a decoder 79 controlled by the viewpoint address. The resolution code from the resolution and position decoder 77 is coupled to a resolution selector 80, the output of which is gated via gate 81 to the associated alarm detection logic. The selected position signal from position selector 76 is coupled to a flip-flop 82, the other input to flip-flop 82 being supplied by a counter 83 which clears flip-flop 82 at the end of a field. The arrangement of FIG. 8 provides a variable vertical resolution as well as a variable position of the sensitized lines of the display. The maps and masks of the system (to be described later) have a constant vertical resolution which covers the full screen to accommodate all possible resolution and positioning combinations. The line sync divided by four provides the necessary 128 lines distributed evenly throughout the frame. In accordance with the system of FIG. 8, three possible resolutions are available:

1: Every video line sampled—this exhausts memory after ¼ of a frame.

2. Every other video line sampled for ½ frame.

3. Every fourth video line sampled for a full frame. This is the same resolution as the maps and masks.

Selection position 1, 2, 3 and 4 of the position selection switches 78 provides ¼ of a frame and the best resolution and the position selector also determines the location of the ¼ frame—that is, upper quadrant, upper-middle quadrant, lower-middle quadrant, lower quadrant. Positions 5, 6 and 7 select every other line resolution for ½ frame at various positions, and position 8 is normal operation with every fourth video line being sampled for full-frame operation. This operation is set forth in the table of FIG. 8*a*. The vertical address generator is incremented by one count for each signal at the output of gate 81 and provides coded outputs (frame vertical addresses) which are coupled to the frame memories so that the sampled information is stored at the proper location in the frame memory. At the end of a frame, the vertical address generator is cleared, and at the end of a field, the line counter 75 and field counter 83 are cleared.

The variable vertical resolution feature is important. For example, if the viewed scene is very distant and the intruders would be small and cover very few of the viewed video points, the ¼ frame resolution selection would condense the points to improve detection.

Also to improve detection, the odd field (which has its lines interlaced with the even field) may have a sample strobe which is horizontally shifted ½ of a sample period. This would cause the points to be offset on every other frame line such as offset bricks in a brick wall. This gives the digital video an approximation to double sample resolution without doubling the sample strobe frequency or memory size.

The vertical sampling rate selector of FIG. 8 allows any channel to have the resolution desired, independent of other channels. Each channel has its own set of switches 78 to select one of the eight resolution position combinations. Possible resolution and positions for each channel are shown in FIG. 8*a*. Full frame resolution always begins at top of screen and covers the full screen. Every time a channel comes up for processing its particular resolution and position is selected and a signal goes out indicating exactly which lines are to be sampled and stored or compared.

Operation: The viewpoint address is fed to decoder 79 and sets a particular resolution signal which allows one of three divider outputs in resolution selector 80 to be enabled. The divider outputs are synchronized to avoid adjacent frame lines from occurring during full resolution selections. Every line is active during ¼ frame resolution.

The positioning system (position selector 76) decides which lines of video will be sampled first or which line will be stored at address 0. Active lines are counted in divider 75 until the desired position is reached. Then, the address begins incrementing until the memory is full for the even field. The same procedure occurs on the odd field until the whole frame is stored. Preferably there are two of these circuits. Upper and lower frame memories are each controlled by their own vertical sampling rate selector. Only one such circuit is shown in FIG. 8.

Figure 9:
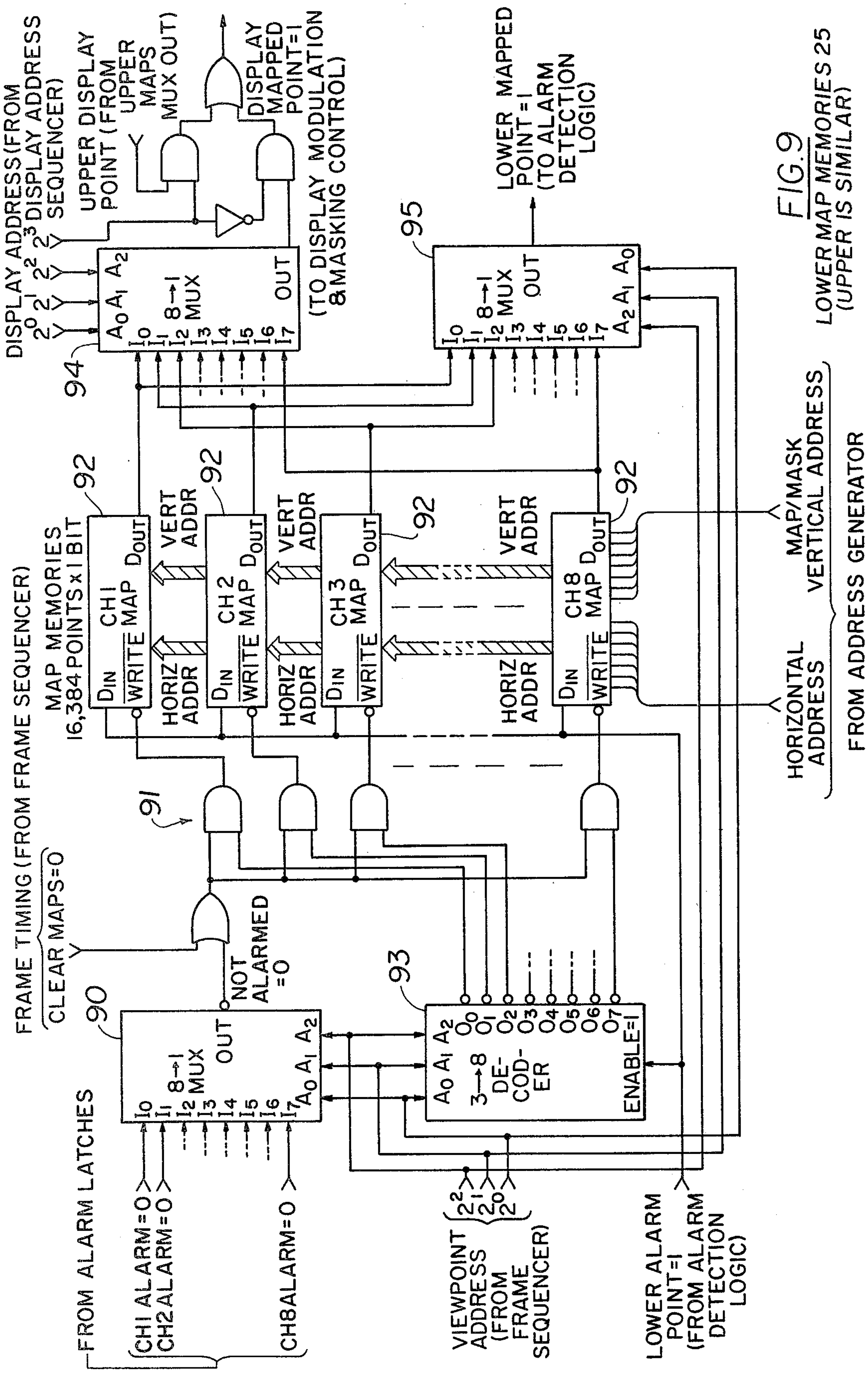
FIG. 9 is a block diagram of an alarm map memory used in the invention.

FIG. 9 illustrates a block diagram of the lower map memories 25, the upper map memories 26 being identical. Channel alarm signals from the alarm latches (FIG. 6) are coupled to a multiplex device 90, the output of which is gated to a plurality of gates 91, one for each channel, the respective outputs of which are supplied to channel maps 92, one for each respective channel. The gates 91 also receive decoded inputs from a decoder 93 which designates the channel as a function of the viewpoint address received from the frame sequencer 28. The address generator 34 (to be described in detail later) provides horizontal and vertical addresses to each of the channel maps 92 so that alarm data is coupled to the proper point in the respective channel map memories. The data outputs of the channel map memories 92 are coupled to 8:1 multiplexers 94,95, multiplexer 94 supplying a gated output signal to the digital modulation and masking control to display map points and multiplexer 95 supplies outputs to the alarm detection logic (lower being shown, but upper being identical).

Figure 10:
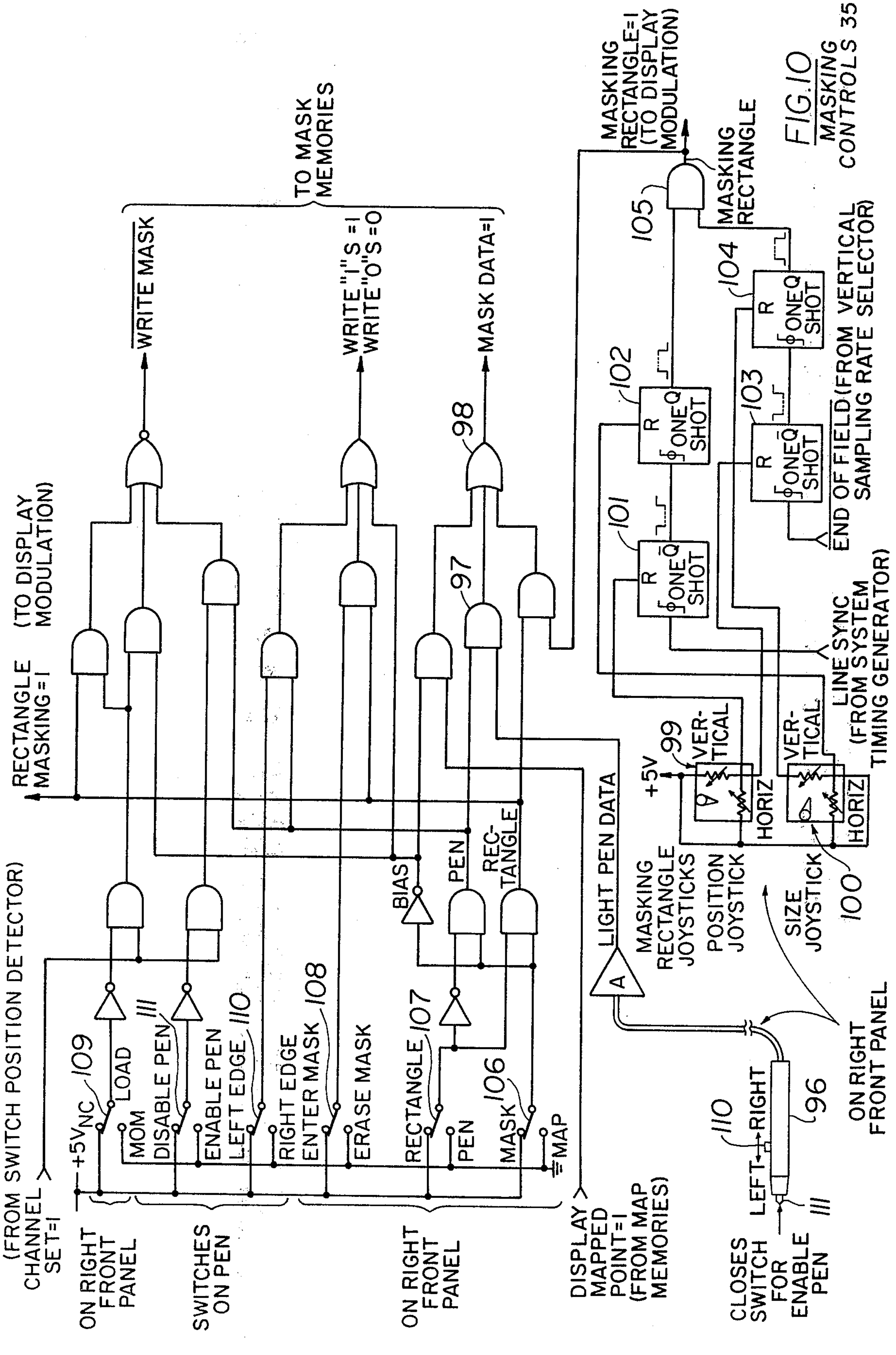
FIG. 10 is a block diagram of masking controls used in the invention.

FIG. 10 illustrates masking controls 35 which comprises a light pen 96 which feeds light pen data to a "mask data" output via gates 97 and 98. The light pen generates masked data outputs corresponding to the positions marked on a screen of a cathode ray tube by the light pen. This permits variable shapes of the mask. Joystick controls 99,100 are provided to vary the position and size of rectangular masks. The data concerning the masking rectangle controlled by joysticks 99,100 is provided via one-shot multivibrators 101–104 and gate 105, the operation of which is not described in detail.

The panel of the device has various switches, as does the light pen, as indicated in FIG. 10 to control various positions and sizes of the mask. Again, details of the masking controls are not given herein. Masks are necessary in order to desensitize certain points within the viewing area. Masks may be erased or entered from the light pen, a masking rectangle (controlled by joysticks 99,100) or by a map. This type of operation is discussed in U.S. Pat. Nos. 3,988,533 and 4,081,830. In order to implement a mask, the channel being masked is first called up for display via a front panel switch. Then a selection of sources is made via additional switches and the selected action is carried out.

As mentioned above, the masking rectangle is controlled by the two joysticks, one for position of the rectangle, and the other for size. The light pen enables the operator to "draw" any desired mask on the CRT screen. If it is desired to mask out points which cause nuisance alarms, masking directly from an alarm map (bias masking) transfers all such nuisance alarm points into the mask memory to inhibit generation of alarms for these nuisance points.

Figure 11:
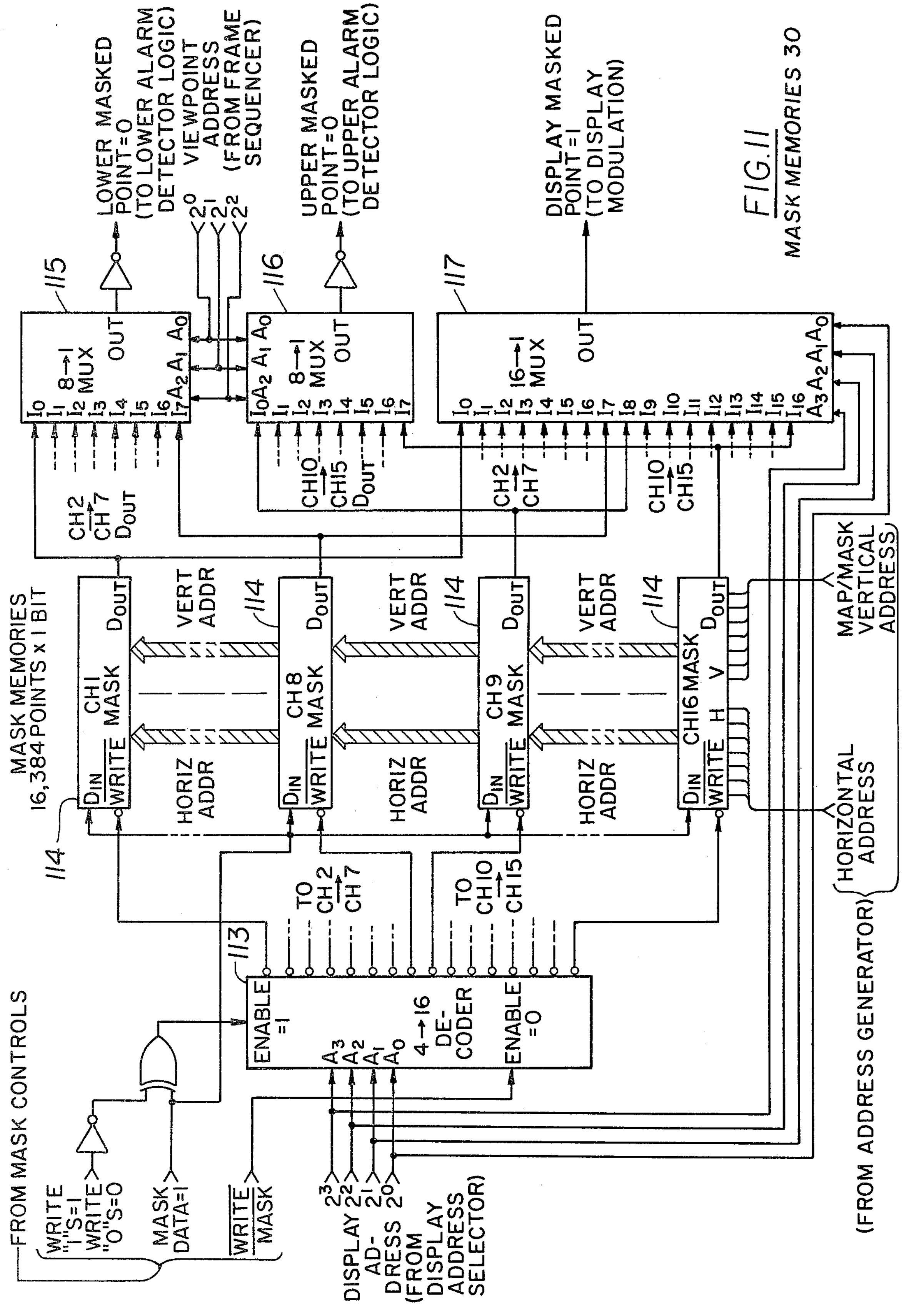
FIG. 11. is a block diagram of mask memories used in the invention.

The mask memories 30 illustrated in FIG. 11 comprise a decoder 113 for receiving display address signals from the display address selector and a mask memory signal from the mask controls of FIG. 10 to generate individual output signals corresponding to respective channels. The individual channel signals are coupled to mask memories 114, one for each respective channel. The mask memories 114 also receive horizontal and vertical address signals from the address generator 34 to insure that the mask information is stored in the proper locations in the respective masks 114. The outputs of the mask memories are coupled to respective 8:1 multiplexers 115,116, and to a 16:1 multiplexer 117. Multiplexer 115 supplies lower mask point information for the lowered numbered channels to the lower alarm detector logic 23 and multiplexer 116 supplies upper mask point data corresponding to the upper numbered channels to the upper alarm detector logic 24. Multiplexers 115,116 are further controlled by viewpoint address signals supplied from the frame sequencer so that output information corresponding to respective channels is generated at the proper timing.

Multiplexer 117 receives information from all of the channels and couples its output, as a function of the display address, to the display modulation circuit (FIG. 15) to darken, for example, or otherwise indicate the mask points on the display.

Figure 14:
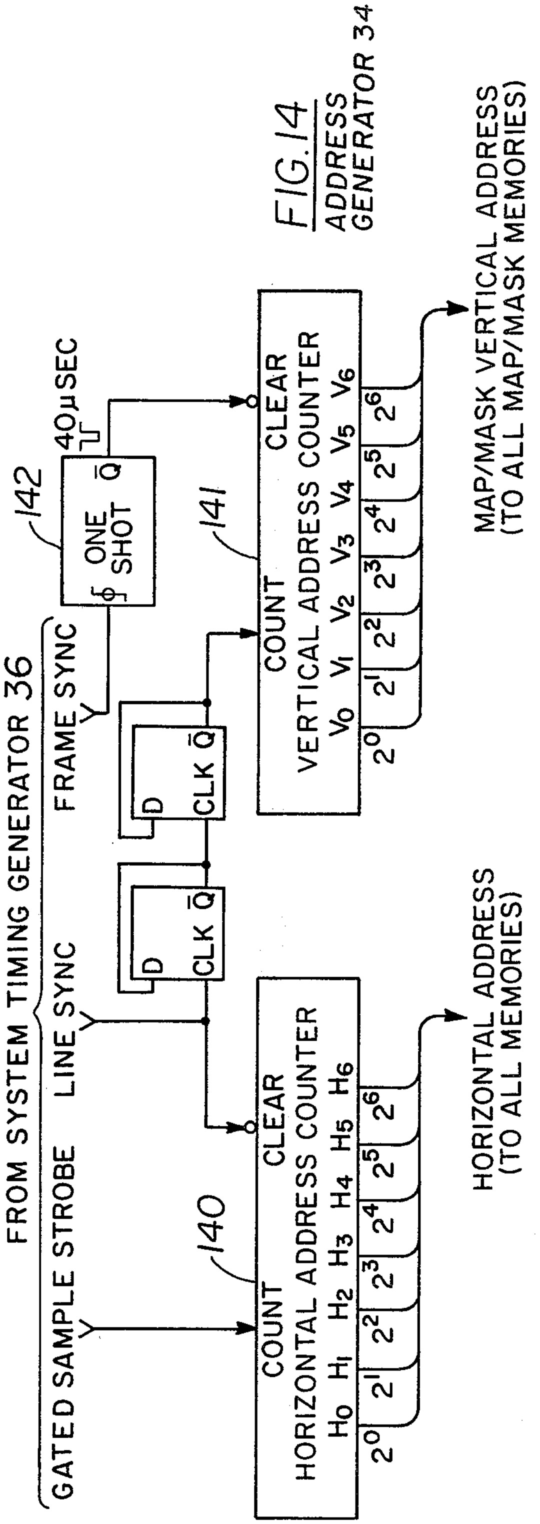
FIG. 14 is a block diagram of an address generator used in the invention.

FIG. 14 illustrates the address generator 34 in more detail, the address generator 34 comprising a horizontal address counter 140 which receives gated sample strobes from the system timing generator 36 and line sync signals to generate a horizontal address which is coupled to all memories of the system. The address generator 34 also comprises a vertical address counter 141 which receives line sync signals divided by four to provide vertical addresses which are sent to the map and mask memories. The frame sync signal is coupled to the vertical address counter via a one-shot multivibrator 142 to clear same at the end of a frame.

The system timing generator is not shown in detail since it comprises an oscillator and various counters to provide the gated sample strobe, line sync and frame sync signals, as required in such systems. The timings of the various signals will vary, depending upon whether the American or European television-type system is used.

Figure 15:
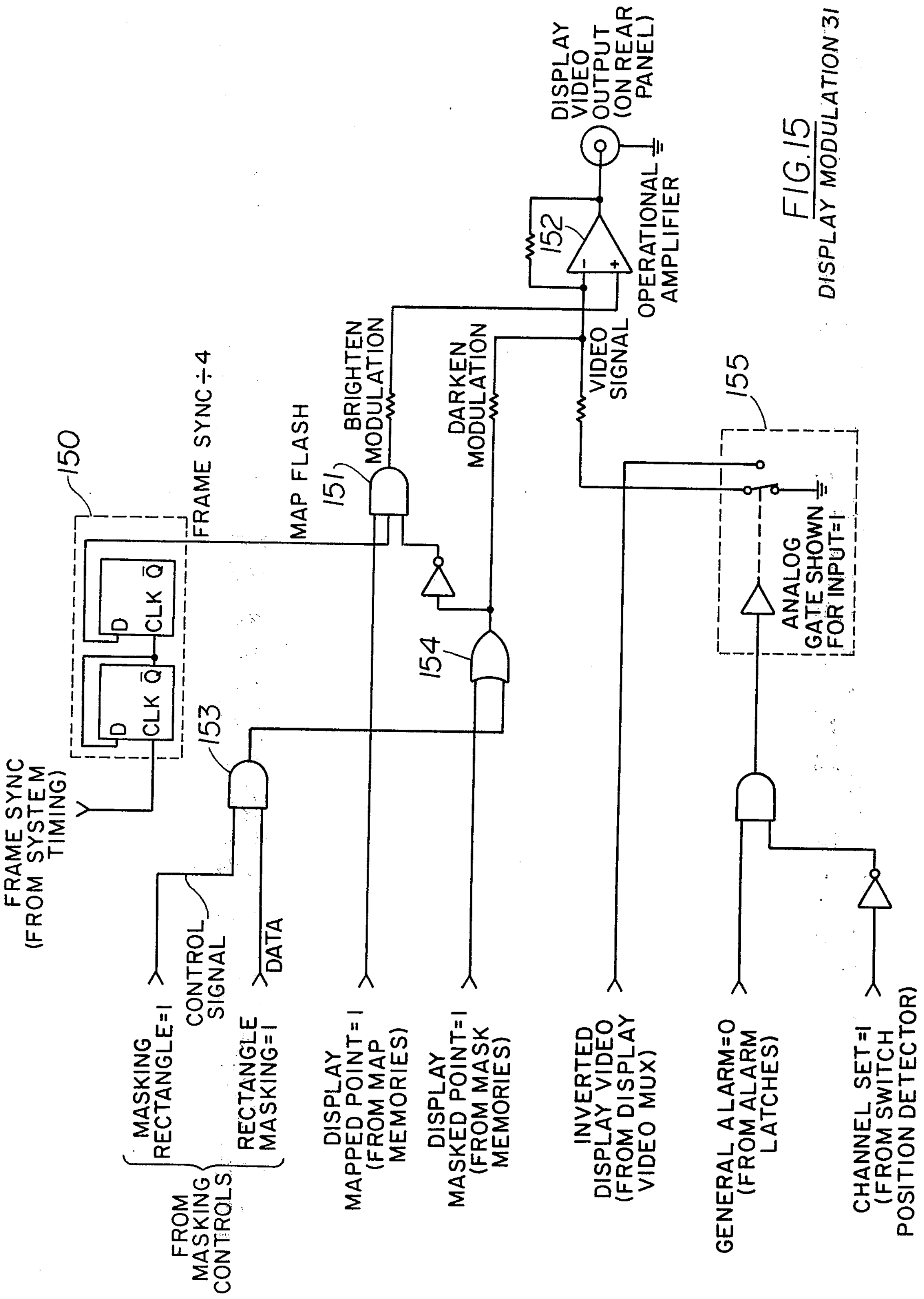
FIG. 15 is a block diagram of a display modulation apparatus of the invention for selectively brightening points of the display.

FIG. 15 illustrates the display modulation circuit 31 which brightens selected points on the video display. The frame sync signal is applied to a divide-by-four circuit 150 to provide a map flash signal which is gated with display map point and display mask point information via gate 151 to an operational amplifier 152 which is coupled to the display video output. This causes the map to flash at, for example, a 7 Hz rate. A darkened modulation signal is supplied to the operational amplifier via gates 153,154 to darken masked points on the display, as desired. Additionally, an analog alarm gate 155 is provided to modulate the display upon detection of a general alarm.

Figure 16:
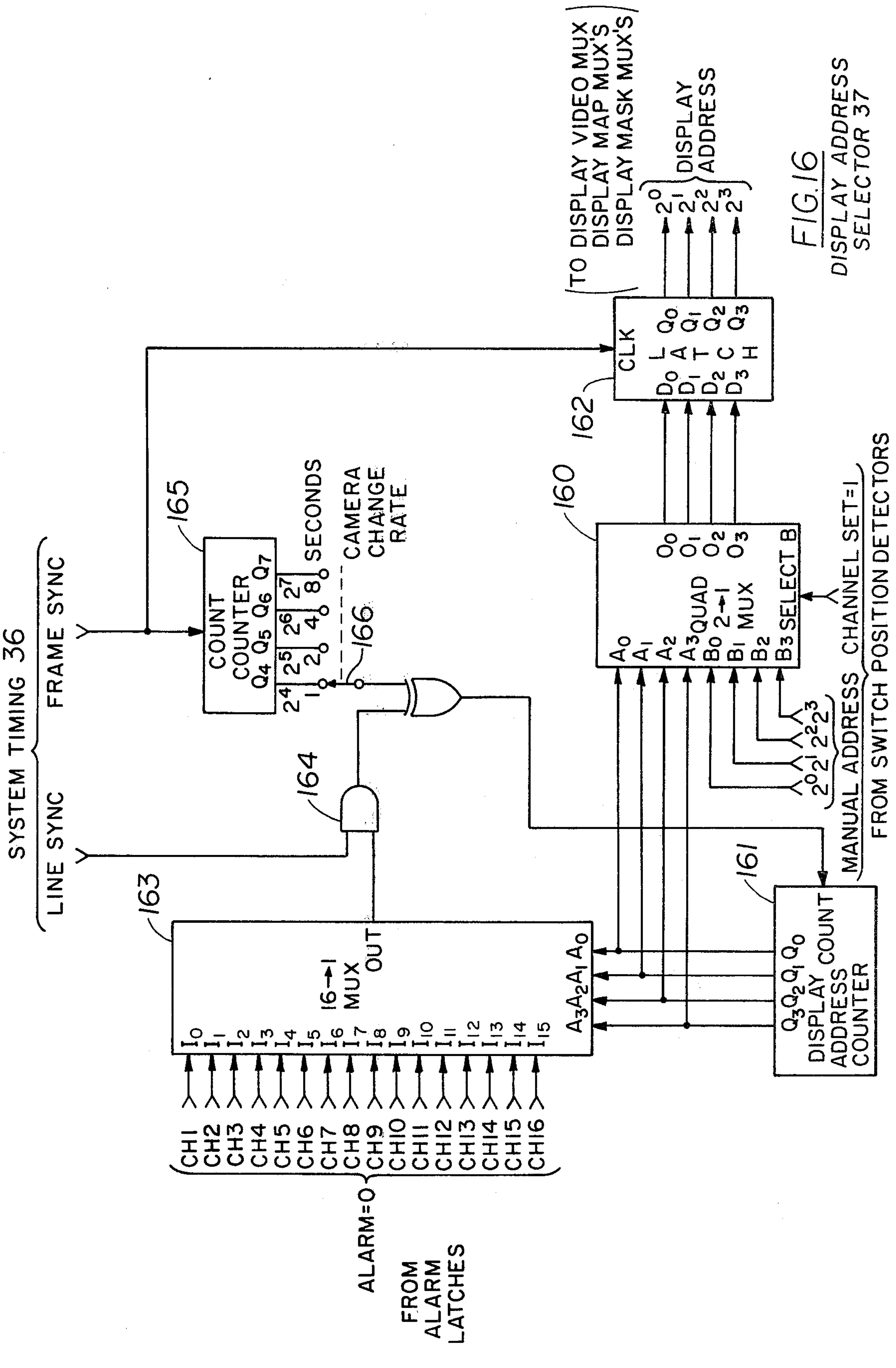
FIG. 16 is a block diagram of the display address selector.

FIG. 16 illustrates the display address selector 37 which receives signals indicating a manually input address via a switch position and alarm indicator 38 (FIG. 1*b*) into a 2:1 multiplexer 160. The multiplexer 160 also receives count information from display address counter 161 and generates output signals corresponding to a display address, which signals are coupled to a latch circuit 162, the output of which is coupled to the display video multiplexers, display map multiplexers and display mask multiplexers. The display address selector operates under control of the system timing signals generated by system timing 36 in order to initiate the various operations. Also, the alarm signals from alarm latches 60–65 (FIG. 6) are coupled as respective inputs to 16:1 multiplexer 163, the multiplexed output of which is gated with the line sync in gate 164, the output of which is coupled to the count input of the display address counter 161. Elements 161, 163, 164–166 function to search for the alarmed channels and to provide their addresses to be displayed. An additional counter 165 receives the frame sync signal to provide outputs to change the camera being examined. The camera change rate can be varied depending upon the setting of switch 166. The frame sync signal also acts as a clock signal for the latch circuit 162.

The above description is for the elements of the invention which are deemed most important to an understanding of the operation of the present invention. Other circuits shown in the drawings which have not been described in detail are of such a nature that anyone skilled in the art to which the present invention pertains can easily implement same within the scope of the disclosure.

While the invention is described with respect to video camera outputs, the video cameras can be replaced by pyro-electric (heat) devices, sound doppler (acoustical) non-video devices, or the like. In the system described, the lighting of the monitored scene is a very important consideration and is costly. Additionally, an illuminated protected area can also, at times, be used to an advantage by an intruder since if he can be observed by the camera, the intruder can also be alerted to the presence of the guard when the guard appears at the monitored site to investigate an intrusion. By providing heat, sound, or other types of detectors, no ambient light would be required. This provides an improvement in the degree of protection for the site, as well as for the guard when he investigates an intrusion. This also would result in a large reduction in operating costs since the monitored site does not require continuous light, thereby reducing installation, maintenance and operational expenses. As should be apparent, the present invention includes within its scope such replacements for video camera detectors.

We claim:

1. A motion detection system comprising:

means for scanning a given field of view and for generating scan signals corresponding to the content of said field of view;

said scanning means including means for scanning said given field at a first predetermined scanning rate and for subsequently scanning said field at a second predetermined scanning rate which is different from said first scanning rate, at least one of each of said first and second predetermined scanning rate scans comprising a scanning cycle;

means responsive to said scan signals at each scanning rate for converting said scan signals into a plurality of coded digital signals which correspond to a predetermined characteristic of said field content at a plurality of points in said field;

first storage means for selectively storing said coded information signals corresponding to said scanning at said first scanning rate;

second storage means for selectively storing said coded information signals corresponding to said scanning at second scanning rate;

means for comparing predetermined coded information corresponding to said plurality of points from a given scan of said field at said first scanning rate with coded information corresponding to said plurality of points generated during a subsequent scan of said field at said first scanning rate on a point-by-point basis, said subsequent scan at said first scanning rate being in the same scanning cycle as said given scan at said first scanning rate or in a subsequent scanning cycle;

means for comparing predetermined coded information corresponding to said plurality of points from a given scan of said field at said second scanning rate with coded information corresponding to said plurality of points generated during a subsequent scan of said field at said second scanning rate on a point-by-point basis, said subsequent scan at said second scanning rate being in the same scanning cycle as said given scan at said second scanning rate or in a subsequent scanning cycle;

means for generating an alarm signal when a given difference is detected between said compared signals for said corresponding points at either of said scanning rates; and means responsive to a given number of said alarm signals for generating an alarm indication.

2. Apparatus according to claim 1 wherein said scans at said first scanning rate are interleaved with said scans of said second scanning rate.

3. Apparatus according to claim 2 wherein said scans of said first scanning rate are slower than said scans of said second scanning rate, a scanning cycle comprising a larger plurality of scans at said second scanning rate than at said first scanning rate.

4. Apparatus according to claim 2 wherein said scanning means is cyclically operable, a cycle of said scanning means comprising a plurality of scans of a given field at said first predetermined scanning rate and a plurality of scans at said second predetermined scanning rate.

5. Apparatus according to claim 4 wherein said first scanning rate is slower than said second rate, each scanning cycle comprising a smaller plurality of scans at said slow scanning rate than said faster scanning rate.

6. Apparatus according to claim 5 wherein said scanning cycle comprises a plurality of said faster scanning rate scans, said plurality of fast scans comprising at least one storage scan wherein information is stored in one of said storage means, and a plurality of comparison scans wherein said stored information is compared with information corresponding to subsequent scans.

7. Apparatus according to claim 6 comprising a plurality of said comparison scans to introduce redundancy into the alarm signal generation.

8. Apparatus according to claim 6 wherein said system comprises a plurality of scanning means for scanning different given fields, and comprising means for selecting a given field for storage and comparison of said information.

9. Apparatus according to claim 8 wherein alternate scanning cycles comprise storing at said slow scan rate and comparing at said slow scanning rate, respectively, for the same field, and wherein each successive cycle comprises both storing and comparison at said fast scanning rate at a given field, the fast scans in successive cycles being for different selected fields.

10. Apparatus according to any one of claims 1, 2, 6 or 9, further comprising means for selectively masking a plurality of points of said field to selectively inhibit or enable generation of alarm signals for said masked points.

11. Apparatus according to claim 1 wherein said system comprises a plurality of scanning means for scanning different fields, and further comprising switching means for selectively coupling said respective scanning means to said converting, storage and comparing means.

12. Apparatus according to claim 11 wherein said first and second storage means comprises means for storing said coded information for a plurality of respective fields, which coded information for said respective fields is generated by respective scanning means.

13. Apparatus according to claim 12 or 11 wherein said comparing means each comprise means for comparing said coded information for respective given fields.

14. Apparatus according to claim 12 wherein said means for generating an alarm signal comprises means responsive to alarm signals from respective fields, and for generating distinctive alarm signals corresponding to said respective fields.

15. Apparatus according to claim 14 wherein said means for generating an alarm indication includes means for generating a distinctive alarm indication corresponding to each respective field.

16. Apparatus according to claim 6 wherein said fast scans of each scanning cycle comprise a first storage scan wherein coded information corresponding to said first storage scan is stored in said first storage means; a second storage scan, the coded information from said second storage scan being compared with the stored information from said first storage scan by said comparing means, whereby if the differences on a point-by-point basis between said compared information is in excess of a given threshhold value, a given code is stored in said storage means indicating a possible noise condition at the point; and at least a first comparison scan during which information from said first comparison scan is compared with the information in said storage means, whereby when said comparison exceeds a given threshhold level, a flag is stored at the corresponding point to indicate an alarm condition.

17. Apparatus according to claim 16 comprising means for inhibiting storing of said flag for points for which said given code was stored.

18. Apparatus according to claim 16 or 17, further comprising an alarm memory for storing said flags at positions in said alarm memory corresponding to respective points of said field.

19. Apparatus according to claim 18 wherein said fast scans of each scanning cycle comprise at least a second comparison scan following said first comparison scan, during which information from said second comparison scan is compared with the information in said storage means, whereby when said comparison exceeds said given threshhold level at both of said first and second comparison scans, a flag is stored at the corresponding point in said alarm memory to indicate an alarm condition.

20. Apparatus according to claim 6 wherein said slow scans comprise a first slow storage scan wherein coded information corresponding to said first slow storage scan is stored in said first storage means; a second slow storage scan, the coded information from said second slow storage scan being compared with the stored information from said first slow storage scan by said comparing means, whereby if differences on a point-by-point basis between said compared information is in excess of a given threshhold value, a given code is stored in said storage means indicating a possible noise condition at the respective point; and at least a first slow comparison scan during which information from said first slow comparison scan is compared with the information in said storage means, whereby when said comparison exceeds a given threshhold value, a flag is stored at the corresponding point to indicate an alarm condition.

21. Apparatus according to claim 20 further comprising at least a second slow comparison scan during which information from said second slow comparison scan is compared with the information in said storage means, whereby when said comparison exceeds a given threshhold value for both said first and second slow comparison scans, an alarm condition is indicated.

22. Apparatus according to claim 20 or 21 wherein said slow storage scans for a given field are carried out in a first scanning cycle, and said slow comparison scans for said same given field are carried out in the next successive scanning cycle.

23. A method of motion detection comprising:

scanning a given field of view and generating scan signals corresponding to the content of said given field of view, said given field being scanned at a first predetermined scanning rate and subsequently scanned at a second predetermined scanning rate which is different from said first scanning rate, wherein at least one of each of said first and second predetermined scanning rate scans comprises a scanning cycle;

converting said scan signals into a plurality of coded digital signals which correspond to a predetermined characteristic of said field content at a plurality of points in said field;

storing said coded information signals corresponding to said scanning at said first scanning rate;

storing said coded information signals corresponding to said scanning at second scanning rate;

comparing predetermined coded information corresponding to said plurality of points from a given scan of said field at said first scanning rate with coded information corresponding to said plurality of points generated during a subsequent scan of said field at said first scanning rate on a point-by-point basis, said subsequent scan at said first scanning rate being in the same scanning cycle as said given scan at said first scanning rate or in a subsequent cycle;

comparing predetermined coded information corresponding to said plurality of points from a given scan of said field at said second scanning rate with coded information corresponding to said plurality of points generated during a subsequent scan of said field at said second scanning rate on a point-by-point basis, said subsequent scan at said second scanning rate being in the same scanning cycle as said given scan at said second scanning rate or in a subsequent scanning cycle;

generating an alarm signal when a given difference is detected between said compared signals for said corresponding points at either of said scanning rates; and generating an alarm indication responsive to a given number of said alarm signals.

24. Method according to claim 23 wherein said scans at said first scanning rate are interleaved with said scans of said second scanning rate.

25. Method according to claim 24 wherein said scans of said first scanning rate are slower than said scans of said second scanning rate, a scanning cycle comprising a larger plurality of scans at said second scanning rate than at said first scanning rate.

26. Method according to claim 24 wherein said scans are cyclical, a cycle of said scans comprising a plurality of scans of a given field at said first predetermined scanning rate and a plurality of scans at said second predetermined scanning rate.

27. Method according to claim 26 wherein said first scanning rate is slower than said second rate, each scanning cycle comprising a smaller plurality of scans at said slow scanning rate than said faster scanning rate.

28. Method according to claim 27 wherein said scanning cycle comprises a plurality of said faster scanning rate scans, said plurality of fast scans comprising at least one storage scan wherein information is stored, and a plurality of comparison scans wherein said stored information is compared with information corresponding to subsequent scans.

29. Method according to claim 28 wherein alternate scanning cycles are carried out, and comprising storing at said slow scan rate and comparing at said slow scanning rate, respectively, for the same field, and wherein each successive scanning cycle comprises both storing and comparison at said fast scanning rate at a given field, the fast scans in successive scanning cycles being for different selected fields.

30. Method according to any one of claims 23, 24, 28 or 29, further comprising selectively masking a plurality of points of said field to selectively inhibit or enable generation of alarm signals for said masked points.

31. Method according to claim 23 comprising generating a distinctive alarm signal responsive to alarm signals from different respective fields.

32. Method according to claim 31 comprising generating a distinctive alarm indication corresponding to each respective field.

33. Method according to claim 28 wherein said fast scans of each scanning cycle comprise a first storage scan wherein coded information corresponding to said first storage scan is stored a second storage scan, the coded information from said second storage scan being compared with the stored information from said first storage scan, whereby if the differences on a point-by-point basis between said compared information is in excess of a given threshhold value, a given code is stored in a storage means indicating a possible noise condition at the point; and at least a first comparison scan during which information from said first comparison scan is compared with the information in said storage means, whereby when said comparison exceeds a given threshhold level, a flag is stored at the corresponding point to indicate an alarm condition.

34. Method according to claim 33 comprising inhibiting storing of said flag for points for which said given code was stored.

35. Method according to claim 33 or 34, further comprising storing said flags at positions in an alarm memory corresponding to respective points of said field.

36. Method according to claim 35 wherein said fast scans of each scanning cycle comprise at least a second comparison scan following said first comparison scan, during which information from said second comparison scan is compared with the information in said storage means, whereby when said comparison exceeds said given threshhold level at both of said first and second comparison scans, a flag is stored at the corresponding point in said alarm memory to indicate an alarm condition.

37. Method according to claim 28 wherein said slow scans comprise a first slow storage scan wherein coded information corresponding to said first slow storage scan is stored; a second slow storage scan, the coded information from said second slow storage scan being compared with the stored information from said first slow storage scan, whereby if differences on a point-by-point basis between said compared information is in excess of a given threshhold value, a given code is stored in a storage means indicating a possible noise condition at the respective point; and at least a first slow comparison scan during which information from said first slow comparison scan is compared with the information in said storage means, whereby when said comparison exceeds a given threshhold value, a flag is stored at the corresponding point to indicate an alarm condition.

38. Method according to claim 37 further comprising at least a second slow comparison scan during which information from said second slow comparison scan is compared with the information in said storage means, whereby when said comparison exceeds a given threshhold value for both said first and second slow comparison scans, an alarm condition is indicated.

39. Method according to claim 37 or 38 wherein said slow storage scans for a given field are carried out in a first scanning cycle, and said slow comparison scans for said same given field are carried out in the next successive scanning cycle.

40. Apparatus according to claim 1 wherein said scanning means comprises a vertical sampling rate selector for varying the vertical sampling rate to thereby provide variable vertical resolution of a display of said field of view.

41. Apparatus according to claim 40 wherein said vertical sampling rate selector comprises means for varying the position on the display of a predetermined portion of said field of view.

42. Apparatus according to claim 1 wherein said scanning means comprises variable vertical resolution means for at least varying the resolution of a display of said field of view.

43. Apparatus according to claim 42 wherein said variable vertical resolution means comprises means for selecting a predetermined portion of a field of view, and means for expanding said selected portion of said field of view for displaying said selected portion over the complete display.

44. Apparatus according to claim 42 or 43 wherein variable vertical resolution means further comprises a position selector for determining the location of a selected portion of said field of view which is to be expanded and displayed with selected resolution.

45. Apparatus according to claim 44 wherein said position selector comprises means for selecting any one of four quandrants of said field of view.

46. Apparatus according to claim 1 wherein said scanning means comprises means for producing an odd scanning field and an even scanning field of a given field of view, scanning lines of said odd scanning field being interlaced with scanning lines of said even scanning field, and means for horizontally shifting the lines of one of said odd and even scanning fields by one-half of a horizontal sample period to offset the sampling points of said odd scanning field relative to the sampling points of said even scanning field by one-half of a sampling period.

47. Apparatus according to claim 42 wherein said scanning means comprises means for scanning a plurality of fields of view, and wherein said variable vertical resolution means comprises means for selectively varying the vertical resolution of any of said fields of view independent of the other fields of view.

48. Method according to claim 23 wherein said scanning step comprises varying the vertical sampling rate to thereby provide variable vertical resolution of a display of said field of view.

49. Method according to claim 48 wherein said scanning step further comprises varying the position on the display of a predetermined portion of said field of view.

50. Method according to claim 23 wherein said scanning step comprises varying the resolution of a display of said field of view by varying the vertical scanning sequence.

51. Method according to claim 50 wherein said varying of said scanning sequence comprises selecting a predetermined portion of a field of view, and then expanding said selected portion of said field of view for displaying said selected portion over the complete display.

52. Method according to claim 50 or 51 wherein said scanning step further comprises selecting the location of a portion of said field of view which is to be expanded and displayed with a selected resolution.

53. Method according to claim 52 wherein said selecting portion of said field of view comprises selecting any one of four quadrants of said field of view.

54. Method according to claim 50 wherein said scanning step comprises scanning a plurality of different fields of view, and wherein said varying of said vertical resolution comprises selectively varying the vertical resolution of any of said fields of view independent of the other fields of view.

55. Method according to claim 23 wherein said scanning step comprises producing an odd scanning field and an even scanning field of a given field of view, scanning lines of said odd scanning field being interlaced with scanning lines of said even scanning field, and horizontally shifting the lines of one of said odd and evenscanning fields by one-half of a horizontal sample period to offset the sampling points of said odd scanning field relative to sampling points of said even scanning field by one-half of a horizontal sampling period.

* * * * *

UNITED STATES PATENT AND TRADEMARK OFFICE

CERTIFICATE OF CORRECTION

PATENT NO. : 4,337,481

DATED : June 29, 1982

INVENTOR(S) : Peter Mick and Donald Beck

It is certified that error appears in the above-identified patent and that said Letters Patent is hereby corrected as shown below:

COLUMN 16, line 31 (claim 33), after "first storage scan is stored" insert --;--.

Signed and Sealed this

*Twenty-first* Day of *September 1982*

[SEAL]

*Attest:*

GERALD J. MOSSINGHOFF

*Attesting Officer* *Commissioner of Patents and Trademarks*